(12) United States Patent
Frank et al.

(10) Patent No.: US 7,685,607 B2
(45) Date of Patent: Mar. 23, 2010

(54) GENERAL PURPOSE EMBEDDED PROCESSOR

(75) Inventors: Steven Frank, 116 Pleasant St., Apt. #1, Easthampton, MA (US) 01027; Shigeki Imai, Nara (JP)

(73) Assignees: Steven Frank, Florence, MA (US); Sharp Corporation, Osaka (JP)

( * ) Notice: Subject to any disclaimer, the term of this patent is extended or adjusted under 35 U.S.C. 154(b) by 633 days.

(21) Appl. No.: 10/735,610

(22) Filed: Dec. 12, 2003

(65) Prior Publication Data
US 2004/0244000 A1 Dec. 2, 2004

Related U.S. Application Data

(63) Continuation of application No. 10/449,732, filed on May 30, 2003.

(51) Int. Cl.
*G06F 13/00* (2006.01)
(52) U.S. Cl. .................. 719/318; 718/102; 718/104; 710/260
(58) Field of Classification Search .......... 719/318; 713/320; 718/102, 104; 710/260
See application file for complete search history.

(56) References Cited

U.S. PATENT DOCUMENTS

| | | | | |
|---|---|---|---|---|
| 4,689,739 | A | * | 8/1987 | Federico et al. ............ 710/264 |
| 5,692,193 | A | * | 11/1997 | Jagannathan et al. ........ 718/106 |
| 5,721,855 | A | * | 2/1998 | Hinton et al. ............... 712/218 |
| 6,219,780 | B1 | | 4/2001 | Lipasti |
| 6,240,508 | B1 | * | 5/2001 | Brown et al. ............... 712/219 |
| 6,272,520 | B1 | | 8/2001 | Sharangpani et al. |
| 6,408,381 | B1 | | 6/2002 | Gearty et al. |
| 6,427,195 | B1 | | 7/2002 | McGowen et al. |
| 6,470,443 | B1 | | 10/2002 | Emer et al. |
| 6,493,741 | B1 | * | 12/2002 | Emer et al. ................. 718/107 |

(Continued)

FOREIGN PATENT DOCUMENTS

JP 10-242833 A 9/1998

OTHER PUBLICATIONS

"Microsoft Computer Dictionary," Fifth Edition, Microsoft Press, 2002; page including "branch instruction" definition; retrieved from <safaribooksonline.com> on Aug. 27, 2008.*

(Continued)

*Primary Examiner*—Andy Ho
(74) *Attorney, Agent, or Firm*—Nutter McClennen & Fish LLP; David J. Powsner

(57) ABSTRACT

The invention provides an embedded processor architecture comprising a plurality of virtual processing units that each execute processes or threads (collectively, "threads"). One or more execution units, which are shared by the processing units, execute instructions from the threads. An event delivery mechanism delivers events—such as, by way of non-limiting example, hardware interrupts, software-initiated signaling events ("software events") and memory events—to respective threads without execution of instructions. Each event can, per aspects of the invention, be processed by the respective thread without execution of instructions outside that thread. The threads need not be constrained to execute on the same respective processing units during the lives of those threads—though, in some embodiments, they can be so constrained. The execution units execute instructions from the threads without needing to know what threads those instructions are from. A pipeline control unit which launches instructions from plural threads for concurrent execution on plural execution units.

61 Claims, 26 Drawing Sheets

U.S. PATENT DOCUMENTS

| | | | |
|---|---|---|---|
| 6,799,317 B1 * | 9/2004 | Heywood et al. | 719/313 |
| 6,912,647 B1 * | 6/2005 | Blandy | 712/24 |
| 7,082,519 B2 * | 7/2006 | Kelsey et al. | 712/228 |
| 7,363,474 B2 * | 4/2008 | Rodgers et al. | 712/227 |
| 2001/0016879 A1 * | 8/2001 | Sekiguchi et al. | 709/319 |
| 2003/0120896 A1 * | 6/2003 | Gosior et al. | 712/32 |
| 2004/0049672 A1 * | 3/2004 | Nollet et al. | 713/100 |

OTHER PUBLICATIONS

Susan J. Eggers, et al. "Simultaneous Multithreading: A Platform for Next-Generation Processors," *IEEE Micro* (Sep./Oct. 1997) pp. 12-19.

Japanese Office Action, issued Apr. 22, 2009, in corresponding application of the instant case, 4 pages.

\* cited by examiner

GENERAL PURPOSE EMBEDDED PROCESSOR

This application is a continuation of, and claims the benefit of priority of, copending, commonly-assigned U.S. patent application Ser. No. 10/449,732, filed May 30, 2003, entitled "Virtual Processor Methods and Apparatus with Unified Event Notification And Consumer-producer Memory Operations," the teachings of which are incorporated herein by reference.

BACKGROUND

The invention pertains to digital data processing and, more particularly, to embedded processor architectures and operation. The invention has application in high-definition digital television, game systems, digital video recorders, video and/or audio players, personal digital assistants, personal knowledge navigators, mobile phones, and other multimedia and non-multimedia devices.

Prior art embedded processor-based or application systems typically combine: (1) one or more general purpose processors, e.g., of the ARM, MIPs or x86 variety, for handling user interface processing, high level application processing, and operating system tasks, with (2) one or more digital signal processors (DSPs), including media processors, dedicated to handling specific types of arithmetic computations at specific interfaces or within specific applications, on real-time/low latency bases. Instead of, or in addition to, the DSPs, special-purpose hardware is often provided to handle dedicated needs that a DSP is unable to handle on a programmable basis, e.g., because the DSP cannot handle multiple activities at once or because the DSP cannot meet needs for a very specialized computational element.

Examples of these prior art systems include personal computers, which typically combine a main processor with a separate graphics processor and a separate sound processor; game systems, which typically combine a main processor and separately programmed graphics processor; digital video recorders, which typically combine a general purpose processor, mpeg2 decoder and encoder chips, and special-purpose digital signal processors; digital televisions, which typically combine a general purpose processor, mpeg2 decoder and encoder chips, and special-purpose DSPs or media processors; mobile phones, which typically combine a processor for user interface and applications processing and special-purpose DSPs for mobile phone GSM, CDMA or other protocol processing.

Prior art patents include U.S. Pat. No. 6,408,381, disclosing a pipeline processor utilizing snapshot files with entries indicating the state of instructions in the various pipeline stages. As the instructions move within the pipeline, the corresponding snapshot file entries are changed. By monitoring those files, the device determines when interim results from one pipe-line stage can be directly forwarded to another stage over an internal operand bus, e.g., without first being stored to the registers.

The prior art also includes U.S. Pat. No. 6,219,780, which concerns improving the throughput of computers with multiple execution units grouped in clusters. This patent suggests identifying "consumer" instructions which are dependent on results from "producer" instructions. Multiple copies of each producer instruction are then executed, one copy in each cluster that will be subsequently used to execute dependent consumer instructions.

The reasons for the general prior art approach—combining general purpose processors with DSPs and/or special-purpose hardware—is the need to handle multiple activities (e.g., events or threads) simultaneously on a real-time basis, where each activity requires a different type of computational element. However, no single prior art processor has the capacity to handle all of the activities. Moreover, some of the activities are of such a nature that no prior art processor is capable of properly handling more than a single one of them. This is particularly true of real-time activities, to which timely performance is degraded, if not wholly prevented, by operating system intervention.

One problem with the prior art approach is hardware design complexity, combined with software complexity in programming and interfacing heterogeneous types of computing elements. Another problem is that both hardware and software must be re-engineered for every application. Moreover, prior art systems do not load balance: capacity cannot be transferred from one hardware element to another.

An object of this invention is to provide improved apparatus and methods for digital data processing. A further object of the invention is to provide such apparatus and methods as support multiple activities, real-time or otherwise, to be executed on a single processor, as well to provide multiple such processors that are capable of working together. A related object is to provide such apparatus and methods as are suitable for an embedded environment or application. Another related object is to provide such apparatus and methods as facilitate design, manufacture, time-to-market, cost and/or maintenance.

A further object of the invention is to provide improved apparatus and methods for embedded (or other) processing that meet the computational, size, power and cost requirements of today's and future appliances, including by way of non-limiting example, digital televisions, digital video recorders, video and/or audio players, personal digital assistants, personal knowledge navigators, and mobile phones, to name but a few.

Yet another object is to provide improved apparatus and methods that support a range of applications.

Still yet another object is to provide such apparatus and methods which are low-cost, low-power and/or support robust rapid-to-market implementations.

SUMMARY

These and other objects are attained by the invention which provides, in one aspect, an embedded processor comprising a plurality of processing units that each execute processes or threads (collectively, "threads"). One or more execution units are shared by the processing units and execute instructions from the threads. An event delivery mechanism delivers events—such as, by way of non-limiting example, hardware interrupts, software-initiated signaling events ("software events") and memory events—to respective threads without execution of instructions. Each event can be processed by the respective thread without execution of instructions outside that thread.

According to related aspects of the invention, the threads need not be constrained to execute on the same respective processing units during the lives of those threads. In still other related aspects, the execution units execute instructions from the threads without needing to know what threads those instructions are from.

The invention provides, in other aspects, an embedded processor as described above that additionally comprises a pipeline control unit which launches instructions from plural threads for concurrent execution on plural execution units. That pipeline control unit can comprise a plurality of instruction queues, each associated with a respective one of the virtual processing units, from which queues instructions are dispatched. In addition to decoding instruction classes from the instruction queues, the pipeline control unit can control access by the virtual processing units to a resource that provides source and destination registers for the dispatched instructions.

According to other related aspects, among the plural execution units is a branch execution unit. This is responsible for any of instruction address generation, address translation and instruction fetching. The branch execution unit can also maintain state for the virtual processing units. It can be controlled by the pipeline control unit, which signals the branch execution unit as each virtual processing unit instruction queue is emptied.

According to other aspects of the invention, plural virtual processing units as discussed above can execute on one embedded processor. While, in related aspects, those plural virtual processing units can execute on multiple embedded processors.

Further aspects of the invention provide an embedded processor comprising a plurality of processing units, each executing one or more threads, as described above. An event delivery mechanism delivers events as described above to respective threads with which those events are associated, without execution of instructions. As above, the processing units can be virtual processing units. And, as above, they can execute on one or more embedded processors.

Embedded processors and systems as described above are capable of executing multiple threads and processing multiple events simultaneously with little or no latency and with no operating system switching overhead. Threads can range from real time video processing, to Linux operating system functions, to end-use applications or games. As such, embedded processor and systems have application, by way of non-limiting example, in supporting the direct execution of the diverse functions required for multimedia or other devices, like a high-definition digital television, game systems, digital video recorders, video and/or audio players, personal digital assistants, personal knowledge navigators, mobile phones, and other multimedia and non-multimedia devices Moreover, embedded processors and systems as described above enable all functions to be developed and executed in a single programming and execution environment without the need for special purpose hardware accelerators, special purpose DSPs, special purpose processors or other special purpose hardware. Where multiple such embedded processors are added together, they work seamlessly, providing greater overall capacity including both more execution capacity and more concurrent thread handling capacity. The addition of those processors is transparent from the perspective of both threads and events that are directed to specific threads. Load balancing is also transparent, in part, because of the way the processor assigns events and threads for processing Other aspects of the invention provide digital data processing system having structures and operating as described above, albeit not in an embedded platform.

Yet further aspects of the invention provide methods paralleling the operation of the systems described above.

These and other aspects invention are evident in the drawings and the description follows.

BRIEF DESCRIPTION OF THE DRAWINGS

A more complete understanding of the invention may be attained by reference to the drawings, in which.

DETAILED DESCRIPTION

Figure 1:
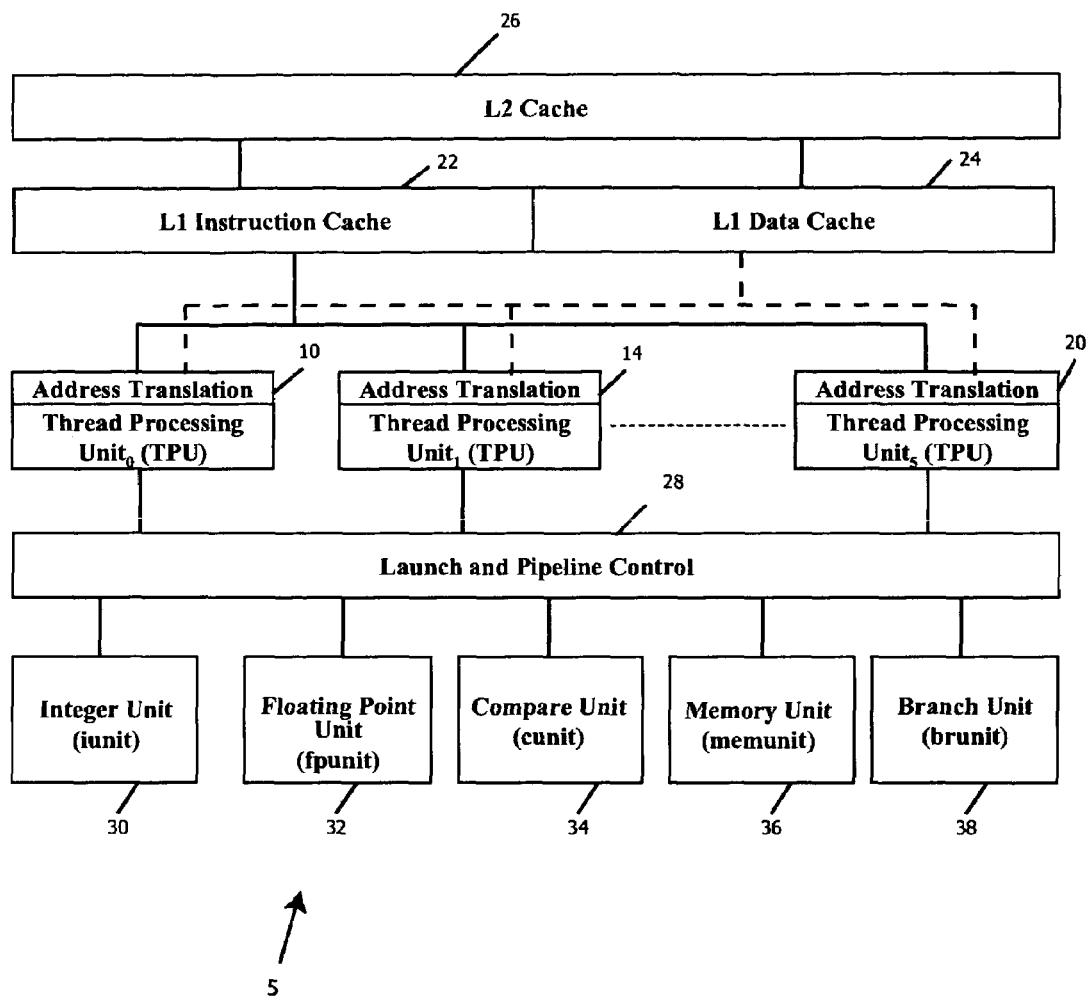
FIG. 1 depicts a processor module constructed and operated in accord with one practice of the invention.

FIG. 1 depicts a processor module 5 constructed and operated in accord with one practice of the invention and referred to occasionally throughout this document and the attached drawings as "SEP". The module can provide the foundation for a general purpose processor, such as a PC, workstation or mainframe computer—though, the illustrated embodiment is utilized as an embedded processor.

The module 5, which may be used singly or in combination with one or more other such modules, is suited inter alia for devices or systems whose computational requirements are parallel in nature and that benefit from multiple concurrently executing applications and/or instruction level parallelism. This can include devices or systems with real-time requirements, those that execute multi-media applications, and/or those with high computational requirements, such as image, signal, graphics and/or network processing. The module is also suited for integration of multiple applications on a single platform, e.g., where there is concurrent application use. It provides for seamless application execution across the devices and/or systems in which it is embedded or otherwise incorporated, as well as across the networks (wired, wireless, or otherwise) or other medium via which those devices and/or systems are coupled. Moreover, the module is suited for peer-to-peer (P2P) applications, as well as those with user interactivity. The foregoing is not intended to be an extensive listing of the applications and environments to which the module 5 is suited, but merely one of examples.

Examples of devices and systems in which the module 5 can be embedded include inter alia digital LCD-TVs, e.g., type shown in FIG. 24, wherein the module 5 is embodied in a system-on-a-chip (SOC) configuration. (Of course, it will be appreciated that the module need not be embodied on a single chip and, rather, can be may be embodied in any of a multitude of form factors, including multiple chips, one or more circuit boards, one or more separately-housed devices, and/or a combination of the foregoing). Further examples include digital video recorders (DVR) and servers, MP3 servers, mobile phones, applications which integrate still and video cameras, game platforms, universal networked displays (e.g., combinations of digital LCD-TV, networked information/Internet appliance, and general-purpose application platform), G3 mobile phones, personal digital assistants, and so forth.

The module 5 includes thread processing units (TPUs) 10-20, level one (L1) instruction and data caches 22, 24, level two (L2) cache 26, pipeline control 28 and execution (or functional units) 30-38, namely, an integer processing unit, a floating-point processing unit, a compare unit, a memory unit, and a branch unit. The units 10-38 are coupled as shown in the drawing and more particularly detailed below.

By way of overview, TPUs 10-20 are virtual processing units, physically implemented within processor module 5, that are each bound to and process one (or more) process(es) and/or thread(s) (collectively, thread(s)) at any given instant. The TPUs have respective per-thread state represented in general purpose registers, predicate registers, control registers. The TPUs share hardware, such as launch and pipeline control, which launches up to five instructions from any combination of threads each cycle. As shown in the drawing, the TPUs additionally share execution units 30-38, which independently execute launched instructions without the need to know what thread they are from.

By way of further overview, illustrated L2 cache 26 is shared by all of the thread processing units 10-20 and stores instructions and data on storage both internal (local) and external to the chip on which the module 5 is embodied. Illustrated L1 instruction and data caches 22, 24, too, are shared by the TPUs 10-20 and are based on storage local to the aforementioned chip. (Of course, it will be appreciated that, in other embodiments, the level1 and level2 caches may be configured differently—e.g., entirely local to the module 5, entirely external, or otherwise).

The design of module 5 is scalable. Two or more modules 5 may be "ganged" in an SoC or other configuration, thereby, increasing the number of active threads and overall processing power. Because of the threading model used by the module 5 and described herein, the resultant increase in TPUs is software transparent. Though the illustrated module 5 has six TPUs 10-20, other embodiments may have a greater number of TPUs (as well, of course, as a lesser number). Additional functional units, moreover, may be provided, for example, boosting the number of instructions launched per cycle from five to 10-15, or higher. As evident in the discussion below of L1 and L2 cache construction, these too may be scaled.

Illustrated module 5 utilizes Linux as an application software environment. In conjunction with multi-threading, this enables real-time and non-real-time applications to run on one platform. It also permits leveraging of open source software and applications to increase product functionality. Moreover, it enables execution of applications from a variety of providers.

Multi-Threading

As noted above, TPUs 10-20 are virtual processing units, physically implemented within a single processor module 5, that are each bound to and process one (or more) thread(s) at any given instant. The threads can embody a wide range applications. Examples useful in digital LCD-TVs, for example, include MPEG2 signal demultiplexing, MPEG2 video decoding, MPEG audio decoding, digital-TV user interface operation, operating system execution (e.g,. Linux). Of course, these and/or other applications may be useful in digital LCD TVs and the range of other devices and systems in which the module 5 may be embodied.

The threads executed by the TPUs are independent but can communicate through memory and events. During each cycle of processor module 5, instructions are launched from as many active-executing threads as necessary to utilize the execution or functional units 30-38. In the illustrated embodiment, a round robin protocol is imposed in this regard to assure "fairness" to the respective threads (though, in other embodiments, priority or other protocols can be used instead or in addition). Although one or more system threads may be executing on the TPUs (e.g., to launch application, facilitate thread activation, and so forth), no operating system intervention is required to execute active threads.

The underlying rationales for supporting multiple active threads (virtual processors) per processor are:

Functional Capability

Multiple active threads per processor enables a single multi-threaded processor to replace multiple application, media, signal processing and network processors. It also enables multiple threads corresponding to application, image, signal processing and networking to operate and interoperate concurrently with low latency and high performance. Context switching and interfacing overhead is minimized. Even within a single image processing application, like MP4 decode, threads can easily operate simultaneously in a pipelined manner to for example prepare data for frame n+1 while frame n is being composed.

Performance

Multiple active threads per processor increases the performance of the individual processor by better utilizing functional units and tolerating memory and other event latency. It is not unusual to gain a 2×performance increase for supporting up to four simultaneously executing threads. Power consumption and die size increases are negligible so that performance per unit power and price performance are improved. Multiple active threads per processor also lowers the performance degradation due to branches and cache misses by having another thread execute during these events. Additionally, it eliminates most context switch overhead and lowers latency for real-time activities. Moreover, it supports a general, high performance event model.

Implementation

Multiple active threads per processor leads to simplification of pipeline and overall design. There is no need for a complex branch predication, since another thread can run. It leads to lower cost of single processor chips vs. multiple processor chips, and to lower cost when other complexities are eliminated. Further, it improves performance per unit power.

Figure 2:
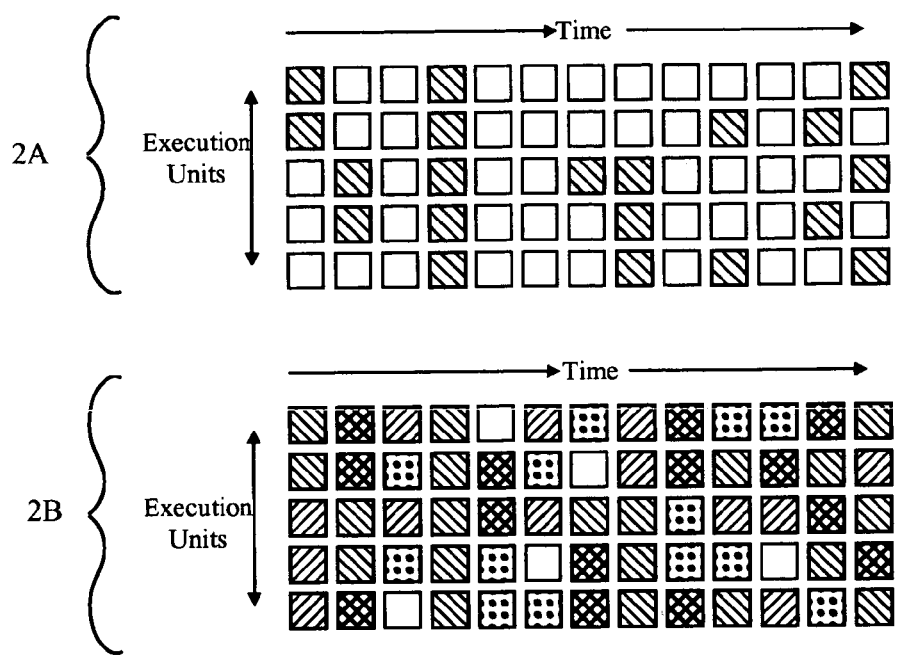
FIG. 2 contrasts thread processing by a conventional superscalar processor with that by a processor module constructed and operated in accord with one practice of the invention.

FIG. 2 contrasts thread processing by a conventional superscalar processor with that of the illustrated processor module 5. Referring to FIG. 2A, in a superscalar processor, instructions from a single executing thread (indicated by diagonal stippling) are dynamically scheduled to execute on available execution units based on the actual parallelism and dependencies within the code being executed. This means that on the average most execution units are not able to be utilized during each cycle. As the number of execution units increases the percentage utilization typically goes down. Also execution units are idle during memory system and branch prediction misses/waits.

In contrast, referring to FIG. 2B, in the module 5, instructions from multiple threads (indicated by different respective stippling patterns) execute simultaneously. Each cycle, the module 5 schedules instructions from multiple threads to optimally utilize available execution unit resources. Thus the execution unit utilization and total performance is higher, while at the same time transparent to software.

Events and Threads

In the illustrated embodiment, events include hardware (or device) events, such as interrupts; software events, which are equivalent to device events but are initiated by software instructions and memory events, such as completion of cache misses or resolution of memory producer-consumer (full-empty) transitions. Hardware interrupts are translated into device events which are typically handled by an idle thread (e.g., a targeted thread or a thread in a targeted group). Software events can be used, for example, to allow one thread to directly wake another thread.

Each event binds to an active thread. If a specific thread binding doesn't exist, it binds to the default system thread which, in the illustrated embodiment, is always active. That thread then processes the event as appropriate including scheduling a new thread on a virtual processor. If the specific thread binding does exist, upon delivery of a hardware or software event (as discussed below in connection with the event delivery mechanism), the targeted thread is transitioned from idle to executing. If the targeted thread is already active and executing, the event is directed to default system thread for handling.

In the illustrated embodiment, threads can become non-executing (block) due to: Memory system stall (short term blockage), including cache miss and waiting on synchronization; Branch miss-prediction (very short term blockage); Explicitly waiting for an event (either software or hardware generated); and System thread explicitly blocking application thread.

In preferred embodiments of the invention, events operate across physical processors modules 5 and networks providing the basis for efficient dynamic distributed execution environment. Thus, for example, a module 5 executing in an digital LCD-TV or other device or system can execute threads and utilize memory dynamically migrated over a network (wireless, wired or otherwise) or other medium from a server or other (remote) device. The thread and memory-based events, for example, assure that a thread can execute transparently on any module 5 operating in accord with the principles hereof. This enables, for example, mobile devices to leverage the power of other networked devices. It also permits transparent execution of peer-to-peer and multi-threaded applications on remote networked devices. Benefits include increased performance, increased functionality and lower power consumption Threads run at two privilege levels, System and Application. System threads can access all state of its thread and all other threads within the processor. An application thread can only access non-privileged state corresponding to itself. By default thread 0 runs at system privilege. Other threads can be configured for system privilege when they are created by a system privilege thread.

Figure 3:
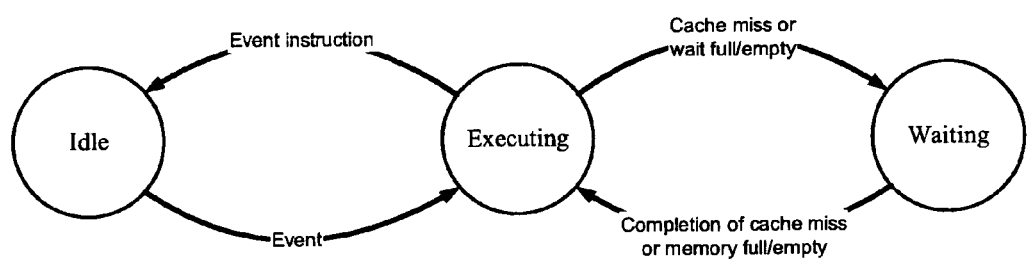
FIG. 3 depicts potential states of a thread executing in a virtual processing unit (or thread processing unit (TPU)) in a processor constructed and operated in accord with one practice of the invention.

Referring to FIG. 3, in the illustrated embodiment, thread states are:

Idle (or Non-active)
Thread context is loaded into a TPU and thread is not executing instructions. An Idle thread transitions to Executing, e.g., when a hardware or software event occurs.

Waiting (or Active, Waiting)
Thread context is loaded into a TPU, but is currently not executing instructions. A Waiting thread transitions to Executing when an event it is waiting for occurs, e.g., a cache operation is completed that would allow the memory instruction to proceed.

Executing (or Active, Executing)
Thread context is loaded into a TPU and is currently executing instructions. A thread transitions to Waiting, e.g., when a memory instruction must wait for cache to complete an operation, e.g. a cache miss or an Empty/Fill (producer-consumer memory) instruction cannot be completed. A thread transitions to idle when a event instruction is executed A thread enable bit (or flag or other indicator) associated with each TPU disables thread execution without disturbing any thread state for software loading and unloading of a thread onto a TPU.

The processor module 5 load balances across active threads based on the availability of instructions to execute. The module also attempts to keep the instruction queues for each thread uniformly full. Thus, the threads that stay active the most will execute the most instructions.

Events

Figure 4:
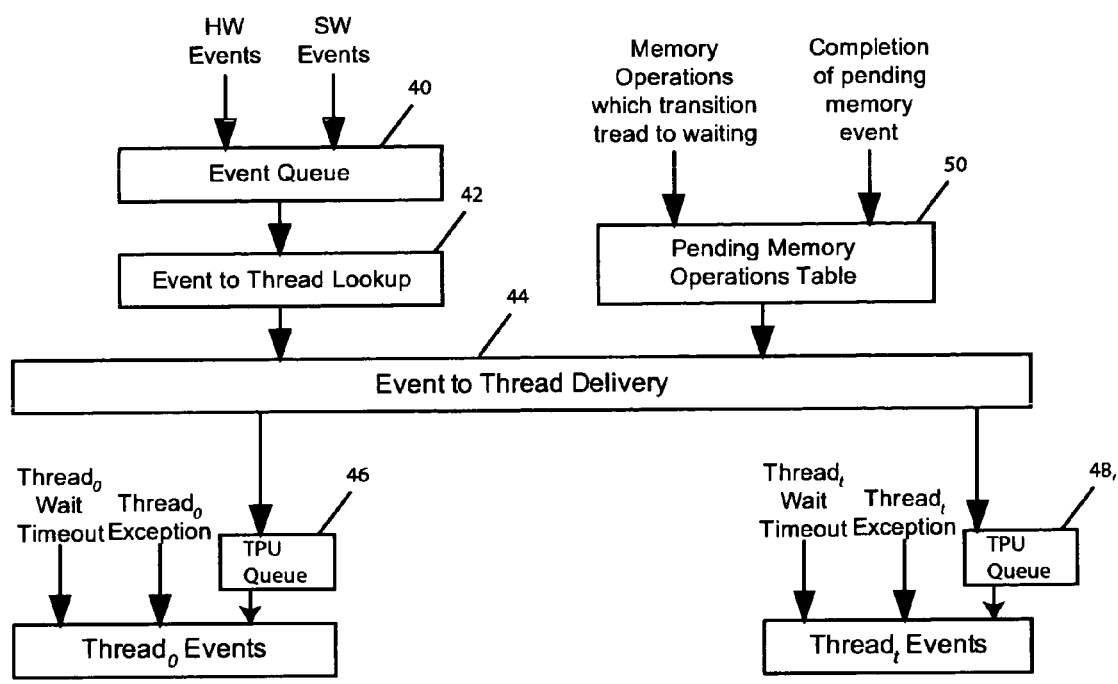
FIG. 4 depicts an event delivery mechanism in a processor module constructed and operated in accord with one practice of invention.

FIG. 4 shows an event delivery mechanism in a system according to the one practice of the invention. When an event is signaled to a thread, the thread suspends execution (if currently in the Executing state) and recognizes the event by executing the default event handler, e.g., at virtual address 0x0.

In the illustrated embodiment, there are five different event types that can be signaled to a specific thread:

| Event | Description | Thread Delivery |
|---|---|---|
| Thread wait timeout | The timeout value from a wait instruction executed by thread$_n$ has expired | thread$_n$ |
| Thread exception | Executing instruction has signaled exception. | thread$_n$ |
| HW Event | Event (like interrupt) generated by hardware device. | thread$_n$ as determined by event to thread lookup instruction specifies thread. If that thread is not Active, Waiting or Idle delivered to default system thread |
| SW Event | Event (like sw interrupt) signaled by sw event instruction | |
| Memory Event | All pending memory operations for a thread$_n$ have completed. | thread$_n$ |

Illustrated Event Queue 40 stages events presented by hardware devices and software-based event instructions (e.g., software "interrupts") in the form of tuples comprising virtual thread number (VTN) and event number:

| 63 | 32 | 31 | 16 | 15 | 4 | 3 | 2 | 1 | 0 |
|---|---|---|---|---|---|---|---|---|---|
| | | threadnum | | eventnum | | | | how | priv |

| Bit | Field | Description |
|---|---|---|
| 0 | priv | Privilege that the event will be signaled at:<br>0. System privilege<br>1. Application privilege |
| 1 | how | Specifies how the event is signaled if the thread is not in idle state. If the thread is in idle state, this field is ignored and the event is directly signalled<br>0. Wait for thread in idle state. All events after this event in the queue wait also.<br>1. Trap thread immediately |
| 15:4 | eventnum | Specifies the logical number for this event. The value of this field is captured in detail field of the system exception status or application exception status register. |
| 31:16 | threadnum | Specifies the logical thread number that this event is signaled to. |

Of course, it will be appreciated that the events presented by the hardware devices and software instructions may be presented in other forms and/or containing other information.

The event tuples are, in turn, passed in the order received to the event-to-thread lookup table (also referred to as the event table or thread lookup table) 42, which determines which TPU is currently handling each indicated thread. The events are then presented, in the form of "TPU events" comprised of event numbers, to the TPUs (and, thereby, their respective threads) via the event-to-thread delivery mechanism 44. If no thread is yet instantiated to handle a particular event, the corresponding event is passed to a default system thread active on one of the TPUs.

The event queue 40 can be implemented in hardware, software and/or a combination thereof. In the embedded, system-on-a-chip (SoC) implementation represented by module 5, the queue is implemented as a series of gates and dedicated buffers providing the requisite queuing function. In alternate embodiments, it is implemented in software (or hardware) linked lists, arrays, or so forth.

The table 42 establishes a mapping between an event number (e.g., hardware interrupt) presented by a hardware device or event instruction and the preferred thread to signal the event to. The possible cases are:

No entry for event number: signal to default system thread.

Present to thread: signal to specific thread number if thread is in Executing, Active or Idle, otherwise signal to specified system thread The table 42 may be a single storage area, dedicated or otherwise, that maintains an updated mapping of events to threads. The table may also constitute multiple storage areas, distributed or otherwise. Regardless, the table 42 may be implemented in hardware, software and/or a combination thereof. In the embedded, SoC implementation represented by module 5, the table is implemented by gates that perform "hardware" lookups on dedicated storage area(s) that maintains an updated mapping of events to threads. That table is software-accessible, as well—for example, by system-level privilege threads which update the mappings as threads are newly loaded into the TPUs 10-20 and/or deactivated and unloaded from them. In turn embodiments, the table 42 is implemented by a software-based lookup of the storage area that maintains the mapping.

The event-to-thread delivery mechanism 44, too, may be implemented in hardware, software and/or a combination thereof. In the embedded, SoC implementation represented by module 5, the mechanism 44 is implemented by gates (and latches) that route the signaled events to TPU queues which, themselves, are implemented as a series of gates and dedicated buffers 46-48 for queuing be delivered events. As above, in alternate embodiments, the mechanism 44 is implemented in software (or other hardware structures) providing the requisite functionality and, likewise, the queues 46-48 are implemented in software (or hardware) linked lists, arrays, or so forth.

An outline of a procedure for processing hardware and software events (i.e., software-initiated signalling events or "software interrupts") in the illustrated embodiment is as follows:

1. Event is signalled to the TPU which is currently executing active thread.
2. That TPU suspends execution of active thread. The Exception Status, Exception IP and Exception MemAddress control registers are set to indicate information corresponding to the event based on the type of event. All—Thread State is valid.
3. The TPU initiates execution at system privilege of the default event handler at virtual address 0x0 with event signaling disabled for the corresponding thread unit. GP registers 0-3 contain and predicate registers 0-1 are utilized as scratch 20 registers by the event handlers and are system privilege. By convention GP[0] is the event processing stack pointer.
4. The event handler saves enough state so that it can make itself re-entrant and re-enable event signaling for the corresponding thread execution unit.
5. Event handler then processes the event, which could just be posting the event to a SW based queue or taking some other action.
6. The event handler then restores state and returns to execution of the original thread.

Memory-related events are handled only somewhat differently. The Pending (Memory) Event Table (PET) 50 holds entries for memory operations (from memory reference instructions) which transition a tread from executing to waiting. The table 50, which may be implemented like the event-to-thread lookup table 42, holds the address of the pending memory operation, state information and thread ID which initiated the reference. When a memory operation is completed corresponding to an entry in the PET and no other pending operations are in the PET for that thread, an PET event is signaled to the corresponding thread.

An outline of memory event processing according to the illustrated embodiment is as follows:

1. Event is signal to unit which is currently executing active thread
2. If the thread is in active-wait state and the event is a Memory Event the thread transitions to active-executing and continues execution at the current IP. Otherwise the event is ignored.

As further shown in the drawing, in the illustrated embodiment, thread wait timeouts and thread exceptions are signalled directly to the threads and are not passed through the event-to-thread delivery mechanism 44.

Traps

The goal of multi-threading and events is such that normal program execution of a thread is not disturbed. The events and interrupts which occur get handled by the appropriate thread that was waiting for the event. There are cases where this is not possible and normal processing must be interrupted. SEP supports trap mechanism for this purpose. A list of actions based on event types follows, with a full list of the traps enumerated in the System Exception Status Register.

| Event Type | Thread State | Privilege Level | Action |
|---|---|---|---|
| Application event | Idle | Application or System | Recognize event by transitioning to execute state, application priv |
| System event | Idle | Application or System | System trap to recognize event, transition to execute state |
| Application event (wait for idle) | Waiting or executing | Application or System | Event stays queued until idle |
| Application event (trap if not idle) | Waiting or executing | Application or System | Application trap to recognize event |
| System event | Waiting or executing | Application | System trap to recognize event |
| System event (wait for idle) | Waiting or executing | System | Event stays queued until idle |
| System event (trap if not idle) | Waiting or executing | System | System trap to recognize event |
| Application Trap | Any | Application | Application trap |
| Application Trap | Any | System | System trap |
| System Trap | Any | Application | System trap, system privilege level |
| System Trap | Any | System | System trap |

Illustrated processor module 5 takes the following actions when a trap occurs:

1. The IP (Instruction Pointer) specifying the next instruction to be executed is loaded in the Exception IP register.
2. The Privilege Level is stored into bit0 of Exception IP register.
3. The Exception type is loaded into Exception State register
4. If the exception is related to a memory unit instruction, the memory address corresponding to exception is loaded into Exception Memory Address register.
5. Current privilege level is set to system.
6. IP (Instruction Pointer) is cleared (zero).
7. Execution begins at IP 0.

Virtual Memory and Memory System

The illustrated processor module 5 utilizes a virtual memory and memory system architecture having a 64-bit Virtual Address (VA) space, a 64-bit System Address (SA) (having different characteristics than a standard physical address), and a segment model of virtual address to system address translation with a sparsely filled VA or SA.

All memory accessed by the TPUs 10-20 is effectively managed as cache, even though off-chin memory may utilize DDR DRAM or other forms of dynamic memory. Referring back to FIG. 1, in the illustrated embodiment, the memory system consists of two logical levels. The level1 cache, which is divided into separate data and instruction caches, 24, 22, respectively, for optimal latency and bandwidth. Illustrated level2 cache 26 consists of an on-chip portion and off-chip portion referred to as level2 extended. As a whole, the level2 cache is the memory system for the individual SEP processor(s) 5 and contributes to a distributed "all cache" memory system in implementations where multiple SEP processors 5 are used. Of course, it will be appreciated that those multiple processors would not have to be physically sharing the same memory system, chips or buses and could, for example, be connected over a network or otherwise.

Figure 5:
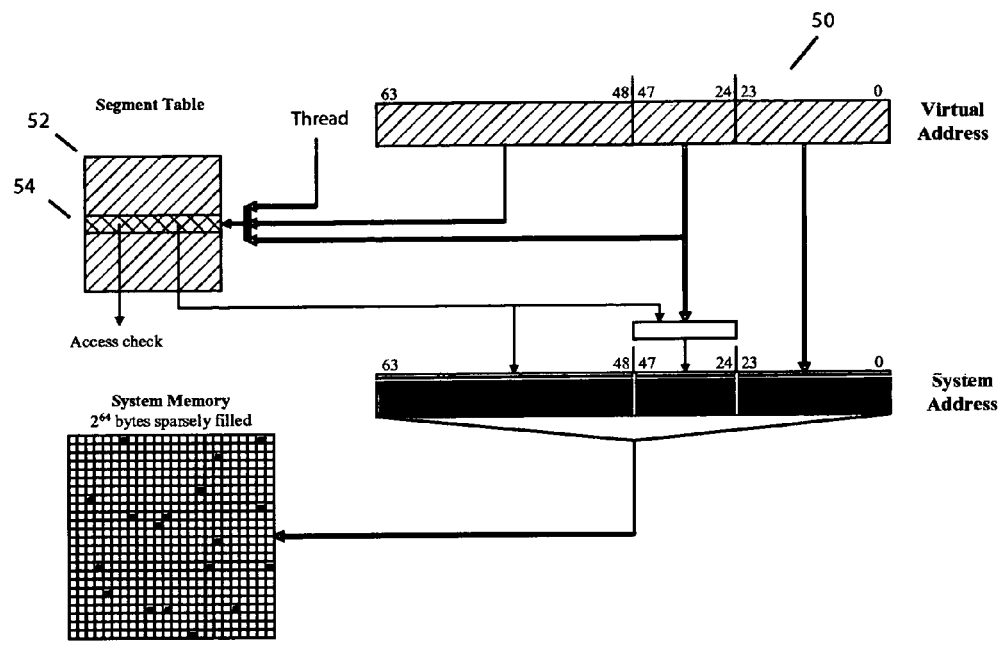
FIG. 5 illustrates a mechanism for virtual address to system address translation in a system constructed and operated in accord with one practice of the invention.

FIG. 5 illustrates VA to SA translation used in the illustrated system, which translation is handled on a segment basis, where (in the illustrated embodiment) those segments can be of variable size, e.g., $2^{24}$-$2^{48}$ bytes. The SAs are cached in the memory system. So an SA that is present in the memory system has an entry in one of the levels of cache 22/24, 26. An SA that is not present in any cache (and the memory system) is effectively not present in the memory system. Thus, the memory system is filled sparsely at the page (and subpage) granularity in a way that is natural to software and OS, without the overhead of page tables on the processor.

In addition to the foregoing the virtual memory and memory system architecture of the illustrated embodiment has the following additional features: Direct support for distributed shared: Memory (DSM), Files (DSF), Objects (DSO), Peer to Peer (DSP2P); Scalable cache and memory system architecture; Segments that can be shared between threads; Fast level1 cache, since lookup is in parallel with tag access, with no complete virtual-to-physical address translation or complexity of virtual cache.

Virtual Memory Overview

A virtual address in the illustrated system is the 64-bit address constructed by memory reference and branch instructions. The virtual address is translated on a per segment basis to a system address which is used to access all system memory and 10 devices. Each segment can vary in size from $2^{24}$ to $2^{48}$ bytes. More specifically, referring to FIG. 5, the virtual address 50 is used to match an entry in a segment table 52 in the manner shown in the drawing. The matched entry 54 specifies the corresponding system address, when taken in combination with the components of the virtual address identified in drawing. In addition, the matched entry 54 specifies the corresponding segment size and privilege. That system address, in turn, maps in to the system memory—which in the illustrated embodiment comprises $2^{64}$ bytes sparsely filled. The illustrated embodiment permits address translation to be disabled by threads with system privilege in which case the segment table is bypassed and all addresses are truncated to the low 32 bits.

Illustrated segment table 52 comprises 16-32 entries per thread (TPU). The table may be implemented in hardware, software and/or a combination thereof. In the embedded, SoC implementation represented by module 5, the table is implemented in hardware, with separated entries in memory being provided for each thread (e.g., a separate table per thread). A segment can be shared among two or more threads by setting up a separate entry for each thread that points to the same system address. Other hardware or software structures may be used instead, or in addition, for this purpose.

Cache Memory System Overview

As noted above, the Level1 cache is organized as separate level1 instruction cache 22 and level1 data cache 24 to maximize instruction and data bandwidth.

Figure 6:
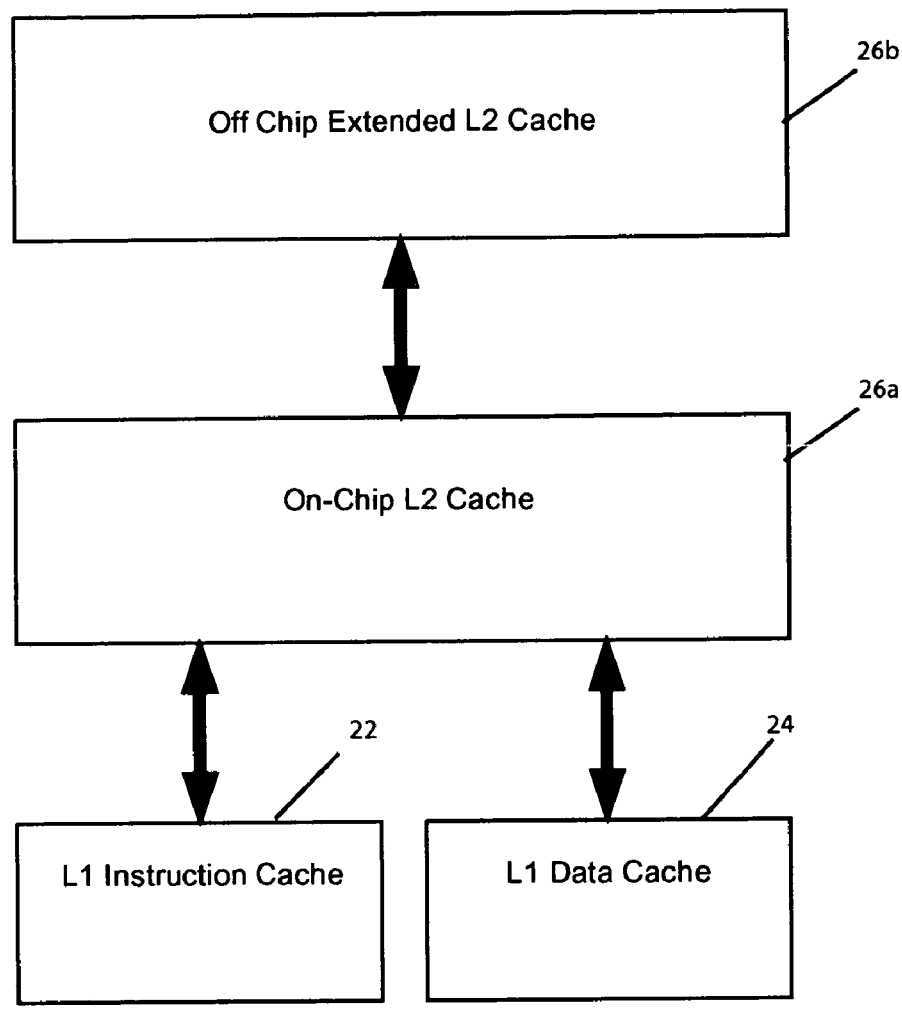
FIG. 6 depicts the organization of Level1 and Level2 caches in a system constructed and operated in accord with one practice the invention.

Referring to FIG. 6, the on-chip L2 cache 26a consists of the tag and data portions. In the illustrated embodiment, it is 0.5-1 Mbytes in size, with 128 blocks, 16-way associative. Each block stores 128 bytes data or 16 extended L2 tags, with 64 kbytes are provided to store the extended L2 tags. A tag-mode bit within the tag indicates that the data portion consists of 16 tags for Extended L2 Cache.

The extended L2 cache 26b is, as noted above, DDR DRAM-based, though other memory types can be employed. In the illustrated embodiment, it is up to 1 gbyte in size, 256-way associative, with 16 k byte pages and 128 byte subpages. For a configuration of 0.5 mbyte L2 cache 26a and 1 gbyte L2 extended cache 26b, only 12% of on-chip L2 cache is required to fully describe L2 extended. For larger on-chip L2 or smaller L2 extended sizes the percentage is lower. The aggregation of L2 caches (on-chip and extended) make up the distributed SEP memory system.

In the illustrated embodiment, both the L1 instruction cache 22 and the L1 data cache 24 are 8-way associative with 32 k bytes and 128 byte blocks. As shown in the drawing, both level1 caches are proper subsets of level2 cache. The level2 cache consists of an on-chip and off chip extended L2 Cache.

Figure 7:
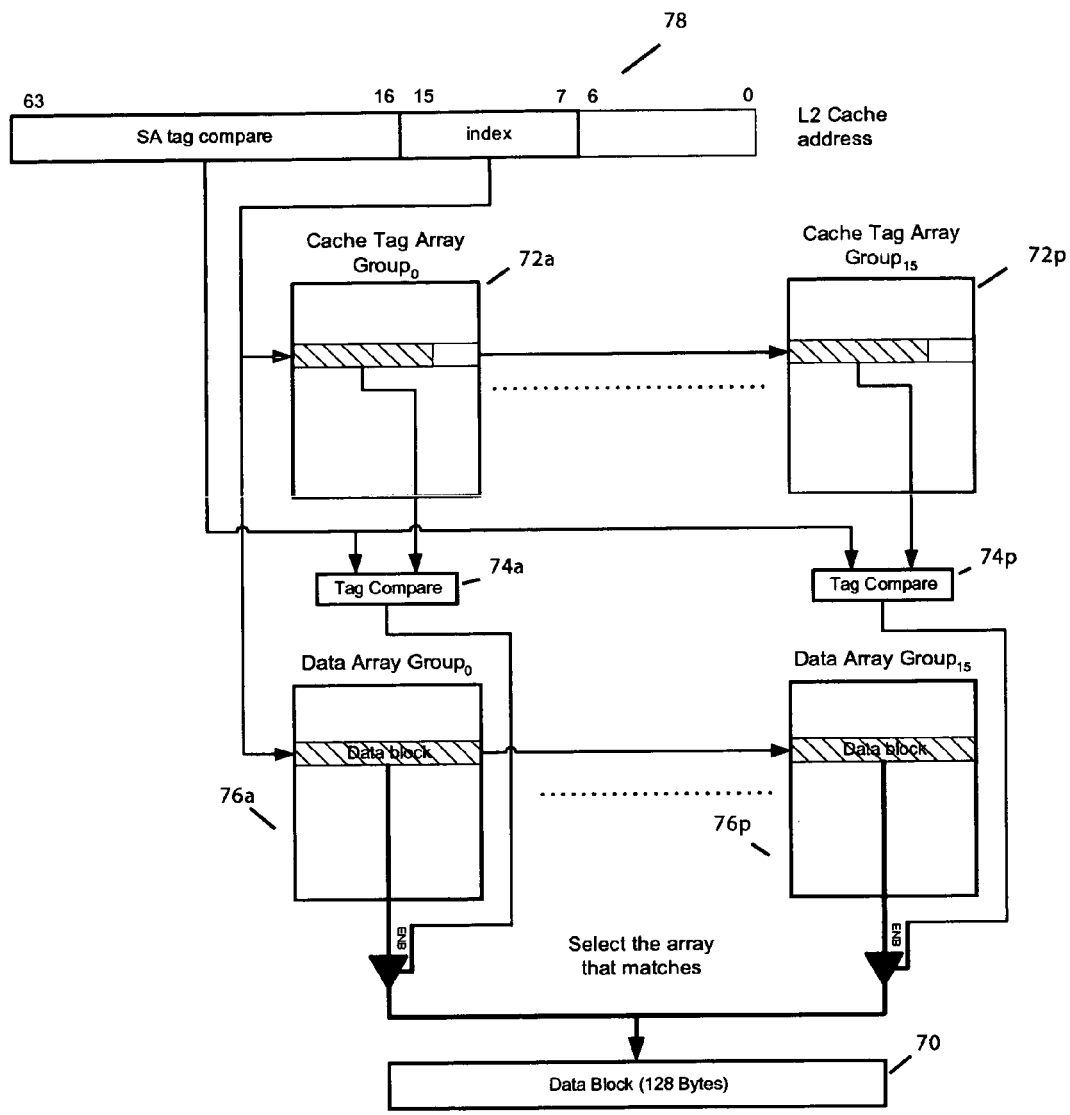
FIG. 7 depicts the L2 cache and the logic used to perform a tag lookup in a system constructed and operated in accord with one practice of invention.

FIG. 7 depicts the L2 cache 26a and the logic used in the illustrated embodiment to perform a tag lookup in L2 cache 26a to identify a data block 70 matching an L2 cache address 78. In the illustrated embodiment, that logic includes sixteen Cache Tag Array Groups 72a-72p, corresponding Tag Compare elements 74a-74p and corresponding Data Array Groups 76a-76p. These are coupled as indicated to match an L2 cache address 78 against the Group Tag Arrays 72a-72p, as shown, and to select the data block 70 identified by the indicated Data Array Group 76a-76p, again, as shown.

Figure 19:
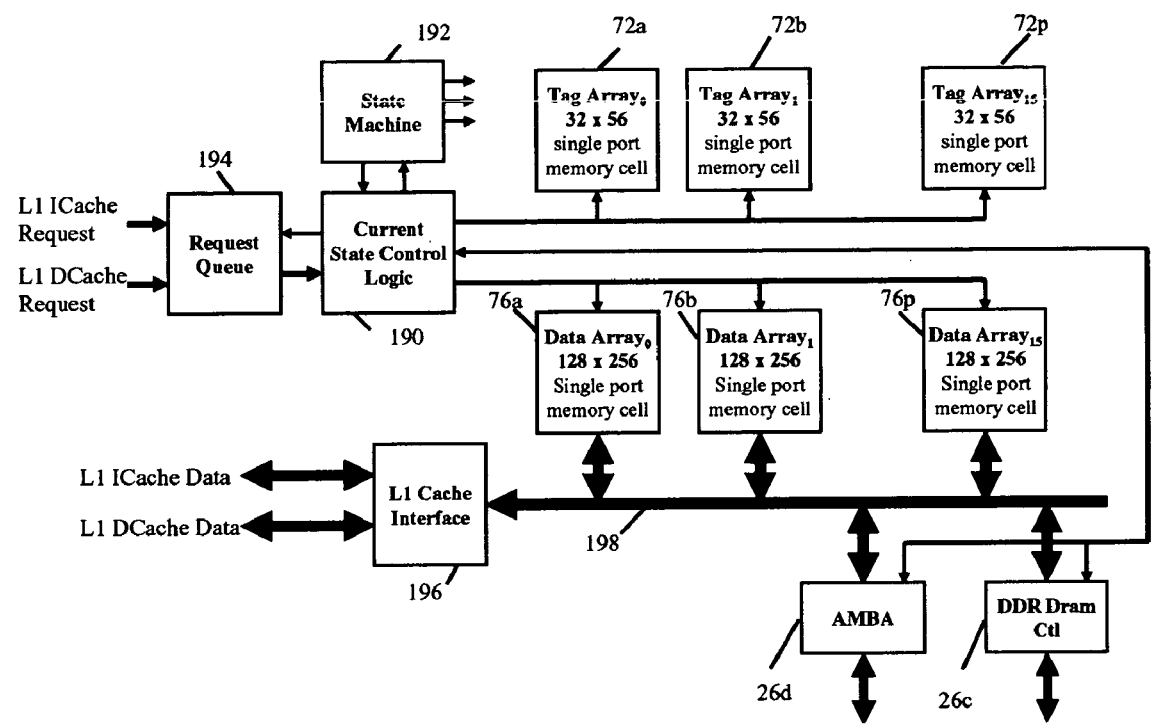
FIG. 19 depicts an implementation of the L2 cache and logic of FIG. 7 in a system constructed and operated in accord with one practice of the invention.

The Cache Tag Array Groups 72a-72p, Tag Compare elements 74a-74p, corresponding Data Array Groups 76a-76p may be implemented in hardware, software and/or a combination thereof. In the embedded, SoC implementation represented by module 5, these are implemented in as shown in FIG. 19, which shows the Cache Tag Array Groups 72a-72p embodied in 32×256 single port memory cells and the Data Array Groups 76a-76p embodied in 128×256 single port memory cells, all coupled with current state control logic 190 as shown. That element is, in turn, coupled to state machine 192 which facilitates operation of the L2 cache unit 26a in a manner consistent herewith, as well as with a request queue 192 which buffers requests from the L1 instruction and data caches 22, 24, as shown.

The logic element 190 is further coupled with DDR DRAM control interface 26c which provides an interface to the off-chip portion 26b of the L2 cache. It is likewise coupled to AMBA interface 26d providing an interface to AMBA-compatible components, such as liquid crystal displays (LCDs), audio out interfaces, video in interfaces, video out interfaces, network interfaces (wireless, wired or otherwise), storage device interfaces, peripheral interfaces (e.g., USB, USB2), bus interfaces (PCI, ATA), to name but a few. The DDR DRAM interface 26c and AMBA interface 26d are likewise coupled to an interface 196 to the L1 instruction and data caches by way of L2 data cache bus 198, as shown.

Figure 8:
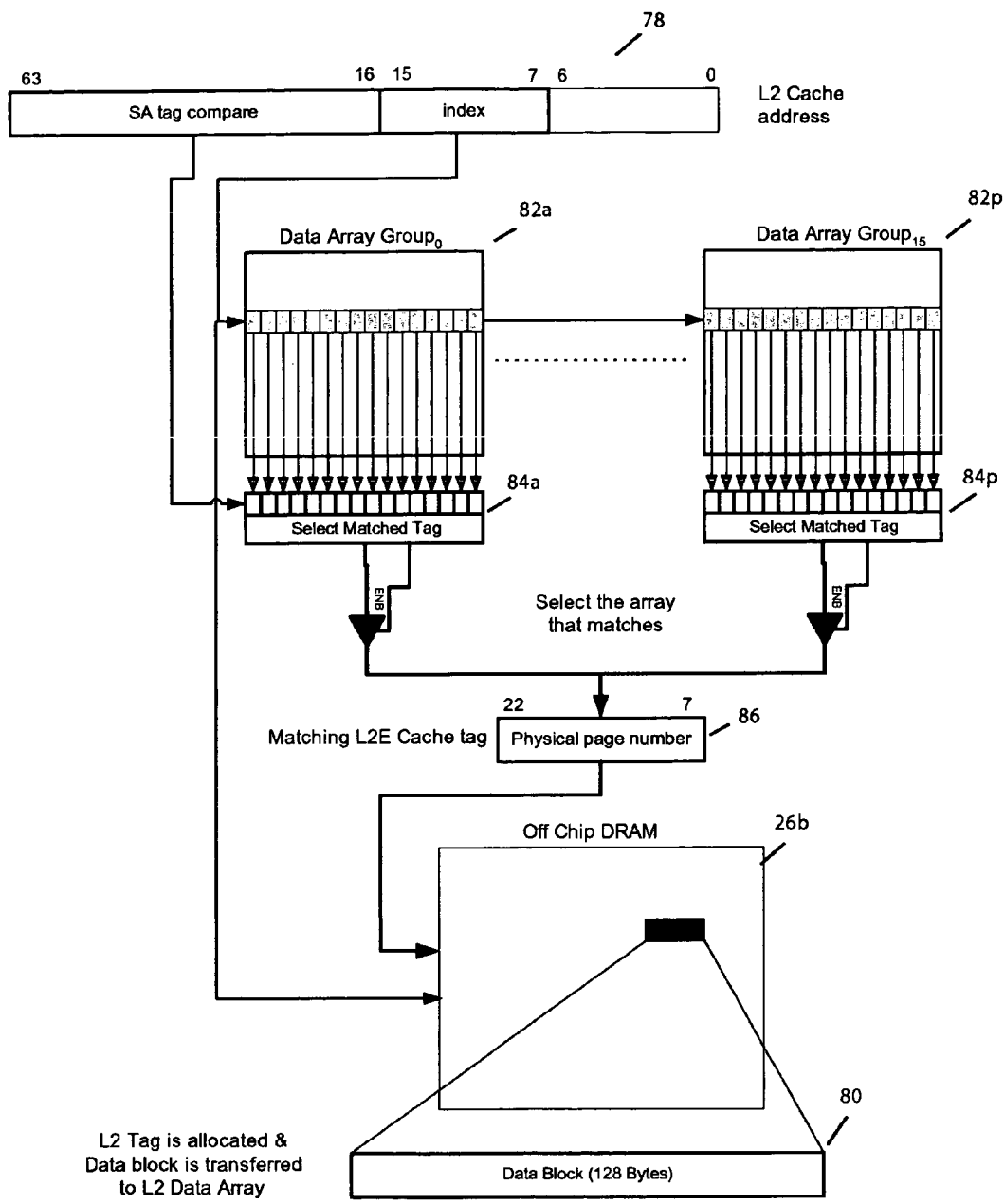
FIG. 8 depicts logic used to perform a tag lookup in the L2 extended cache in a system constructed and operated in accord with one practice invention.

FIG. 8 likewise depicts the logic used in the illustrated embodiment to perform a tag lookup in L2 extended cache 26b and to identify a data block 80 matching the designated address 78. In the illustrated embodiment, that logic includes Data Array Groups 82a-82p, corresponding Tag Compare elements 84a-84p, and Tag Latch 86. These are coupled as indicated to match an L2 cache address 78 against the Data Array Groups 72a-72p, as shown, and to select a tag from one of those groups that matches the corresponding portion of the address 78, again, as shown. The physical page number from the matching tag is combined with the index portion of the address 78, as shown, to identify data block 80 in the off chip memory 26b.

The Data Array Groups 82a-82p and Tag Compare elements 84a-84p may be implemented in hardware, software and/or a combination thereof. In the embedded, SoC implementation represented by module 5, these are implemented in gates and dedicated memory providing the requisite lookup and tag comparison functions. Other hardware or software structures may be used instead, or in addition, for this purpose.

The following is a pseudo-code illustrates L2 and L2E cache operation in the illustrated embodiment:

L2 tag lookup, if hit respond back with data to L1 cache
    else L2E tag lookup, if hit
        allocate tag in L2;
        access L2E data, store in corresponding L2 entry;
        respond back with data to L1 cache;
    else extended L2E tag lookup
        allocate L2E tag;
        allocate tag in L2;
        access L2E data, store in corresponding L2 entry;
        respond back with data to L1 cache;

Thread Processign Unit State

Figure 9:
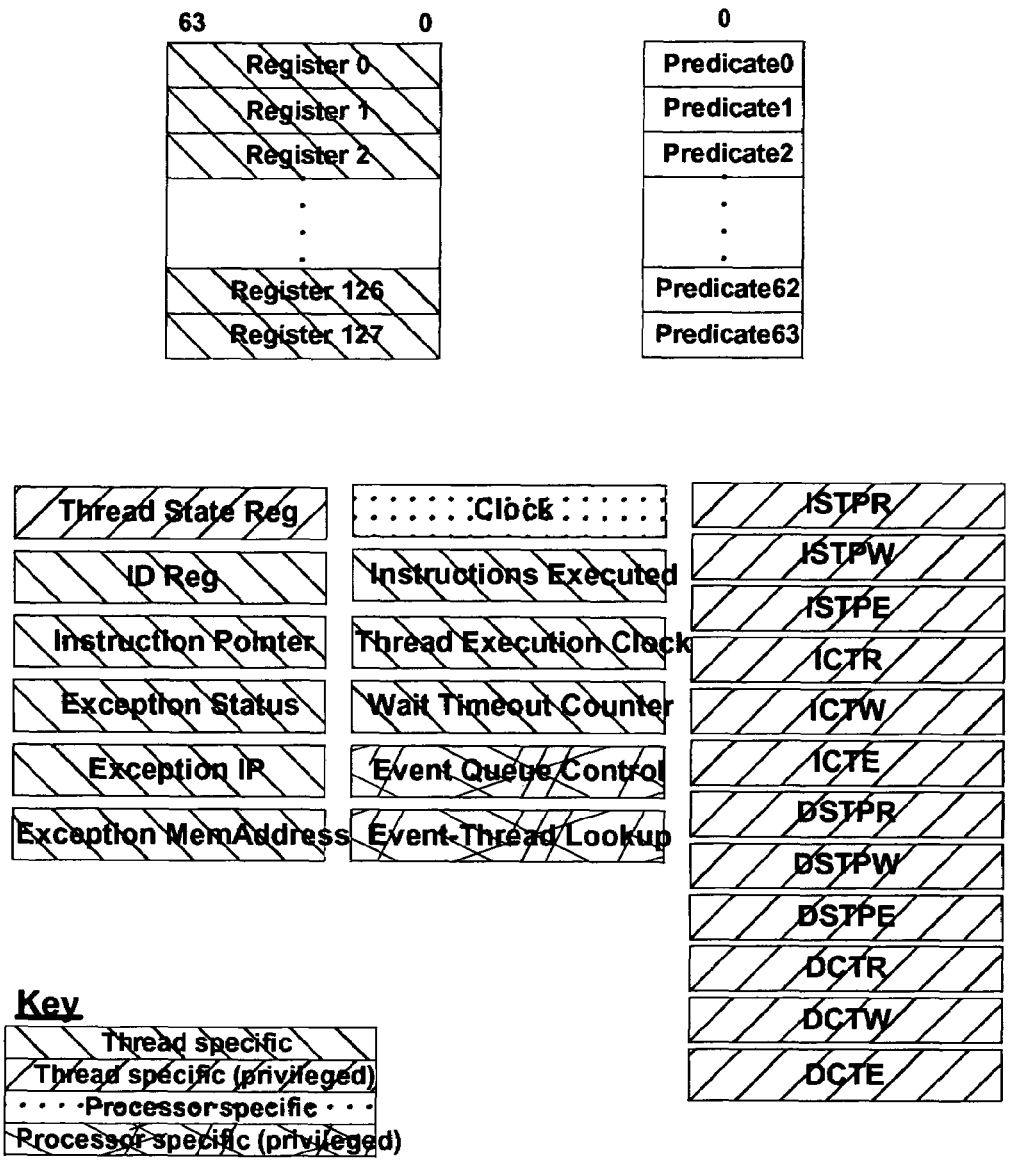
FIG. 9 depicts general-purpose registers, predicate registers and thread state or control registers maintained for each thread processing unit (TPU) in a system constructed and operated in accord with one practice of the invention.

Referring to FIG. 9, the illustrated embodiment has six TPUs supporting up to six active threads. Each TPU 10-20 includes general-purpose registers, predicate registers, and control registers, as shown in FIG. 9. Threads at both system and application privilege levels contain identical state, although some thread state information is only visible when at system privilege level—as indicated by the key and respective stippling patterns. In addition to registers, each TPU additionally includes a pending memory event table, an event queue and an event-to-thread lookup table, none of which are shown in FIG. 9.

Depending on the embodiment, there can be from 48 (or fewer) to 128 (or greater) general-purpose registers, with the illustrated embodiment having 128; 24 (or fewer) to 64 (or greater) predicate registers, with the illustrated embodiment having 32; six (or fewer) to 256 (or greater) active threads, with the illustrated embodiment having 8; a pending memory event table of 16 (or fewer) to 512 (or greater) entries, with the illustrated embodiment having 16; a number of pending memory events per thread, preferably of at least two (though potentially less); an event queue of 256 (or greater, or fewer); and an event-to-thread lookup table of 16 (or fewer) to 256 (or greater) entries, with the illustrated embodiment having 32.

General Purpose Registers

In the illustrated embodiment, each thread has up to 128 general purpose registers depending on the implementation. General Purpose registers 3-0 (GP[3:0]) are visible at system privilege level and can be utilized for event stack pointer and working registers during early stages of event processing.

Predication Registers

The predicate registers are part of the general purpose SEP predication mechanism. The execution of each instruction is conditional based on the value of the reference predicate register.

The SEP provides up to 64 one-bit predicate registers as part of thread state. Each predicate register holds what is called a predicate, which is set to 1 (true) or reset to 0 (false) based on the result of executing a compare instruction. Predicate registers 3-1 (PR[3:1]) are visible at system privilege level and can be utilized for working predicates during early stages of event processing. Predicate register 0 is read only and always reads as 1, true. It is by instructions to make their execution unconditional.

Control Registers

Thread State Register

| 63 | 20 | 19 | 18 | 17 | 16 | 15 | 8 | 6 | 5 | 4 | 3 | 2 | 1 | 0 |
|---|---|---|---|---|---|---|---|---|---|---|---|---|---|---|
| | | daddr | iaddr | align | endian | mod | | | Thread state | | priv | tenable | atrapen | strapen |

| Bit | Field | Description | Privilege | Per | Design Usage |
|---|---|---|---|---|---|
| 0 | strapen | System trap enable. On reset cleared. Signalling of system trap resets this bit and atrapen until it is set again by software when it is once again re-entrant. 0- System traps disabled 1- Events enabled | system_rw | Thread | Branch |
| 1 | atrapen | Application trap enable. On reset cleared. Signalling of application trap resets this bit until it is set again by software when it is once again re-entrant. Application trap is cause by an event that is marked as application level when the privilege level is also application level 0- Events disabled (events are disabled on event delivery to thread) 1- Events enabled | app_rw | Thread | |
| 2 | tenable | Thread Enable. On reset set for thread 0, cleared for all other threads 0- Thread operation is disabled. System thread can load or store thread state. 1- Thread operation is enabled. | System_rw | Thread | Branch |
| 3 | priv | Privilege level. On reset cleared. 0- System privilege 1- Application privilege | System_rw App_r | Thread | Branch |
| 5:4 | state | Thread State. On reset set to "executing" for thread0, set to "idle" for all other threads. 0- Idle 1- reserved 2- Waiting 3- Executing | System_rw | Thread | Branch |
| 15:8 | mod[7:0] | GP Registers Modified. Cleared on reset. bit 8 registers 0-15 bit 9 registers 16-31 bit 10 registers 32-47 bit 11 registers 48-63 bit 12 registers 63-79 bit 13 registers 80-95 bit 14 registers 96-111 bit 15 registers 112-127 | App_rw | Thread | Pipe |
| 16 | endian | Endian Mode-On reset cleared. 0- little endian 1- big endian | System_rw App_r | Proc | Mem |
| 17 | align | Alignment check-When clear, unaligned memory references are allowed. When set, all un-aligned memory references result in unaligned data reference fault. On reset cleared. | System_rw App_r | Proc | Mem |
| 18 | iaddr | Instruction address translation enable. On reset cleared. 0- disabled 1- enabled | System_rw App_r | Proc | Branch |
| 19 | daddr | Data address translation enable. On reset cleared. 0- disabled 1- enabled | System_rw App_r | Proc | Mem |

ID Resister

| 63 | 32 | 39 | 32 | 31 | 16 | 15 | 8 | 7 | 0 |
|---|---|---|---|---|---|---|---|---|---|
|  |  |  |  | thread_id | | id | | type | |

| Bit | Field | Description | Privilege | Per |
|---|---|---|---|---|
| 7:0 | type | Processor type and revision[7:0] | read only | Proc |
| 15:8 | id | Processor ID[7:0]- Virtual processor number | read only | Thread |
| 31:16 | thread_id | Thread ID[15:0] | System_rw App_ro | Thread |

Instruction Pointer Register

| 63 | 4 | 3 | 1 | 0 |
|---|---|---|---|---|
| Doubleword | | mask | | 0 |

Specifies the 64-bit virtual address of the next instruction to be executed.

| Bit | Field | Description | Privilege | Per |
|---|---|---|---|---|
| 63:4 | Doubleword | Address of instruction doubleword | app | thread |
| 3:2 | mask | Indicates which instructions within instruction doubleword remain to be executed. Bit1- first instruction doubleword bit[40:00] Bit2- second instruction doubleword bit[81:41] Bit3- third instruction doubleword, bit[122:82] | app | thread |
| 0 | | Always read as zero | app | thread |

System Exception Status Register

| 63 | 4 | 15 | 4 | 3 | 0 |
|---|---|---|---|---|---|
|  |  | detail | | etype | |

| Bit | Field | Description | Privilege | Per |
|---|---|---|---|---|
| 3:0 | etype | Exception Type<br>0. none<br>1. event<br>2. timer event<br>3. SystemCall<br>4. Single Step<br>5. Protection Fault<br>6. Protection Fault, system call<br>7. Memory reference Fault<br>8. SW event<br>9. HW fault<br>10. others | read only | Thread |

-continued

| Bit | Field | Description | Privilege | Per |
|---|---|---|---|---|
| 15:4 | detail | Fault details- Valid for the following exception types:<br>Memory reference fault details (type 5)<br>1. None<br>2. waiting for fill<br>3. waiting for empty<br>4. waiting for completion of cache miss<br>5. memory reference error<br>event (type 1) - Specifies the 12 bit event number | | |

Application Exception Status Register

| 63 | 4 | 15 | 4 | 3 | 0 |
|---|---|---|---|---|---|
|  |  | detail | | etype | |

| Bit | Field | Description | Privilege | Per |
|---|---|---|---|---|
| 3:0 | etype | Exception Type<br>0. none<br>1. event<br>2. timer event<br>3. SystemCall<br>4. Single Step<br>5. Protection Fault<br>6. Protection Fault, system call<br>7. Memory reference Fault<br>8. SW event<br>9. HW fault<br>10. Others | read only | Thread |
| 15:4 | detail | Protection Fault details- Valid for the following exception types:<br>event (type 1) - Specifies the 12 bit event number | | |

System Exception IP

| 63 | 4 | 3 | 1 | 0 |
|---|---|---|---|---|
| Doubleword | | mask | | priv |

Address of instruction corresponding to signaled exception to system privilege. Bit[0] is the privilege level at the time of the exception.

| Bit | Field | Description | Privilege | Per |
|---|---|---|---|---|
| 63:4 | Doubleword | Address of instruction doubleword which signaled exception | system | thread |
| 3:1 | mask | Indicates which instructions within instruction doubleword remain to be executed. Bit1- first instruction doubleword bit[40:00] Bit2- second instruction doubleword bit[81:41] | system | thread |

| Bit | Field | Description | Privilege | Per |
|---|---|---|---|---|
| | | Bit3- third instruction doubleword, bit[122:82] | | |
| 0 | priv | Privilege level of thread at time of exception | system | thread |

Address of instruction corresponding to signaled exception. Bit[0] is the privilege level at the time of the exception.
Application Exception IP

| 63 | | 4 | 3 | 1 | 0 |
|---|---|---|---|---|---|
| | Doubleword | | mask | | |

Address of instruction corresponding to signaled exception to application privilege.

| Bit | Field | Description | Privilege | Per |
|---|---|---|---|---|
| 63:4 | Doubleword | Address of instruction doubleword which signaled exception | system | thread |
| 3:1 | mask | Indicates which instructions within instruction doubleword remain to be executed. Bit1- first instruction doubleword bit[40:00] Bit2- second instruction doubleword bit[81:41] Bit3- third instruction doubleword, bit[122:82] | system | thread |

Address of instruction corresponding to signaled exception. Bit[0] is the privilege level at the time of the exception.
Exception Mem Address

| 63 | 0 |
|---|---|
| | Address |

Address of memory reference that signaled exception. Valid only for memory faults. Holds the address of the pending memory operation when the Exception Status register indicates memory reference fault, waiting for fill or waiting for empty.

Instruction Seg Table Pointer (ISTP), Data Seg Table Pointer (DSTP)

| 63 | 32 | 31 | 6 | 5 | 1 | 0 |
|---|---|---|---|---|---|---|
| | | reserved | | ste number | | field |

Utilized by ISTE and ISTE registers to specify the ste and field that is read or written.

| Bit | Field | Description | Privilege | Per |
|---|---|---|---|---|
| 0 | field | Specifies the low (0) or high (1) portion of Segment Table Entry | system | thread |
| 5:1 | ste number | Specifies the STE number that is read into STE Data Register. | system | thread |

Instruction Segment Table Entry (ISTE), Data Segment Table Entry (DSTE)

| 63 | 0 |
|---|---|
| | data |

When read the STE specified by ISTE register is placed in the destination general register. When written, the STE specified by ISTE or DSTE is written from the general purpose source register. The format of segment table entry is specified in Chapter 6-section titled Translation Table organization and entry description.

Instruction or Data Level1 Cache Tag Pointer (ICTP, DCTP)

| 63 | 32 | 15 | 14 | 13 | 7 | 6 | 2 | 1 | 0 |
|---|---|---|---|---|---|---|---|---|---|
| | | reserved | | index | | bank | | | |

Specifies the Instruction Cache Tag entry that is read or written by the ICTE or DCTE.

| Bit | Field | Description | Privilege | Per |
|---|---|---|---|---|
| 6:2 | bank | Specifies the bank that is read from Level1 Cache Tag Entry. The first implementation has valid banks 0x0-f. | system | thread |
| 13:7 | index | Specifies the index address within a bank that is read from Level1 Cache Tag Entry | System | thread |

Instruction or Data Level1 Cache Tag Entry (ICTE, DCTE)

| 63 | 0 |
|---|---|
| | data |

When read the Cache Tag specified by ICTP or DCTP register is placed in the destination general register. When written, the Cache Tag specified by ICTP or DCTP is written from the general purpose source register. The format of cache tag entry is specified in Chapter 6-section titled Translation Table organization and entry description.

Event Queue Control Register

| 63 | 32 | 31 | 19 | 18 | 17 | 2 | 1 | 0 |
|---|---|---|---|---|---|---|---|---|
|  |  | address | | offset | event | | reg_op | |

The Event Queue Control Register (EQCR) enables normal and diagnostic access to the event queue. The sequence for using the register is a register write followed by a register read. The contents of the reg_op field specifies the operation for the write and the next read. The actual register modification or read is triggered by the write.

| Bit | Field | Description | Privilege | Per |
|---|---|---|---|---|
| 1:0 | reg_op | Specifies the register operation for that write and the next read. Valid for register read. 0- read 1- write 2- push onto queue 3- pop from queue | system | proc |
| 17:2 | event | For writes and push specifies the event number written or pushed onto the queue. For read and pop operations contains the event number read or popped from the queue | system | proc |
| 18 | empty | Indicates whether the queue was empty prior to the current operation. | system | proc |
| 31:19 | address | Specifies the address for read and write queue operations. Address field is don't care for push and pop operations. | system | proc |

Event-Thread Lookup Table Control

| 63 | 9 | 48 | 41 | 40 | 33 | 32 | 17 | 32 | 1 | 0 |
|---|---|---|---|---|---|---|---|---|---|---|
|  |  | address | | thread | | mask | | event | | reg_op |

The Event to Thread lookup table establishes a mapping between an event number presented by a hardware device or event instruction and the preferred thread to signal the event to. Each entry in the table specifies an event number with a bit mask and a corresponding thread that the event is mapped to.

| Bit | Field | Description | Privilege | Per |
|---|---|---|---|---|
| 0 | reg_op | Specifies the register operation for that write and the next read. Valid for register read. 0- read 1- write | system | proc |
| 16:1 | event[15:0] | For writes specifies the event number written at the specified table address. For read operations contains the event number at the specified table address | system | proc |
| 32:17 | mask[15:0] | Specifies whether the corresponding event bit is significant. 0- significant 1- don't care | system | proc |
| 40:33 | thread | | | |
| 48:41 | address | Specifies the table address for read and write operations. Address field is don't care for push and pop operations. | system | proc |

Timers and Performance Monitor

In the illustrated embodiment, all timer and performance monitor registers are accessible at application privilege.

Clock

| 63 | 0 |
|---|---|
| clock | |

| Bit | Field | Description | Privilege | Per |
|---|---|---|---|---|
| 63:0 | clock | Number of clock cycles since processor reset | app | proc |

Instructions Executed

| 63 | 32 | 31 | 0 |
|---|---|---|---|
|  |  | count | |

| Bit | Field | Description | Privilege | Per |
|---|---|---|---|---|
| 31:0 | count | Saturating count of the number of instruction executed. Cleared on read. Value of all 1's indicates that the count has overflowed. | app | thread |

Thread Execution Clock

| 63 | 32 | 31 | 0 |
|---|---|---|---|
|  |  | active | |

| Bit | Field | Description | Privilege | Per |
|---|---|---|---|---|
| 31:0 | active | Saturating count of the number of cycles the thread is in active-executing state. Cleared on read. Value of all 1's indicates that the count has overflowed. | app | thread |

Wait Timeout Counter

| 63 | 32 | 31 | 0 |
|---|---|---|---|
|  |  | timeout |  |

| Bit | Field | Description | Privilege | Per |
|---|---|---|---|---|
| 31:0 | timeout | Count of the number of cycles remaining until a timeout event is signaled to thread. Decrements by one, each clock cycle. | app | thread |

Virtual Processor and Thread ID

In the illustrated embodiment, each active thread corresponds to a virtual processor and is specified by a 8-bit active thread number (activethread[7:0]). The module 5 supports a 16-bit thread ID (threaded[15:0]) to enable rapid loading (activation) and unloading (de-activation) of threads. Other embodiments may support thread IDs of different sizes.

Thread-Instruction Fetch Abstraction

Figure 10:
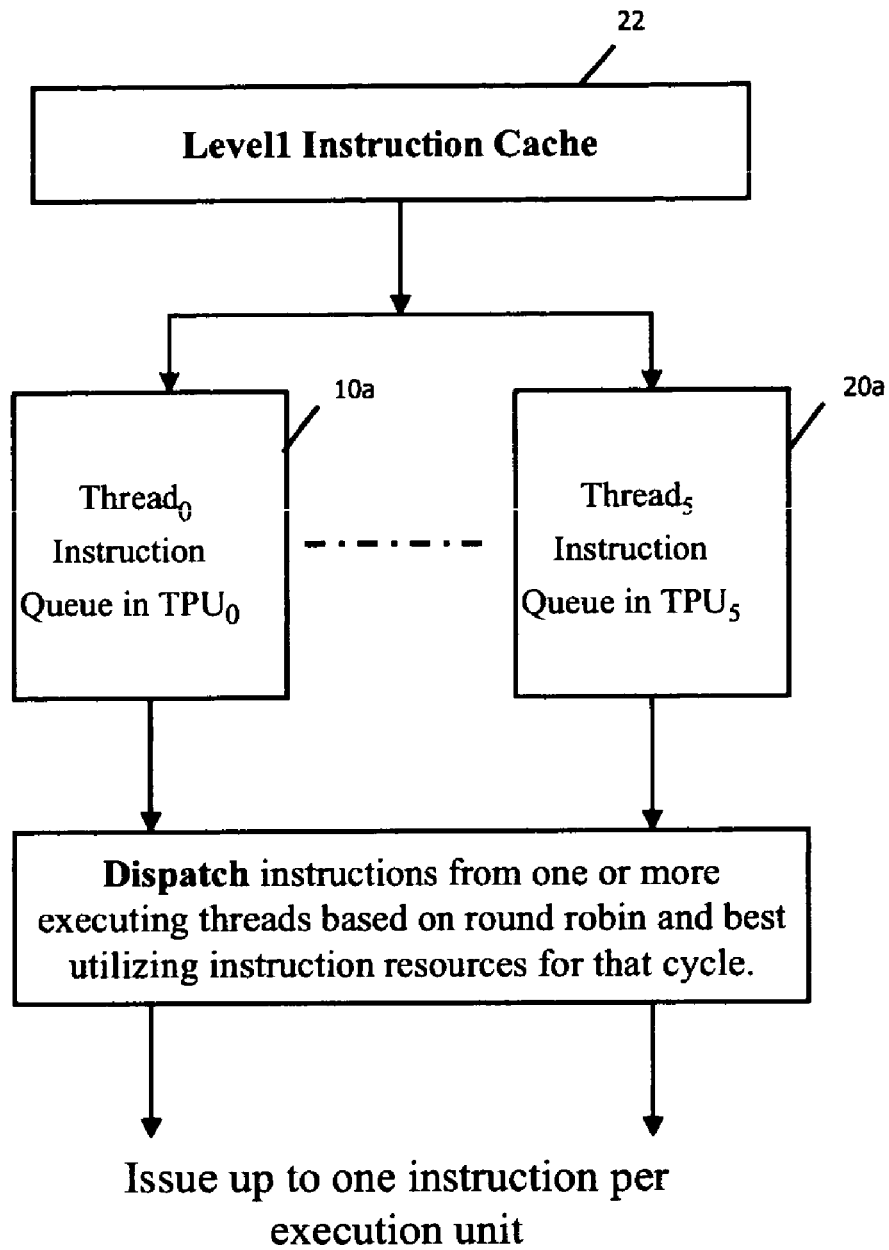
FIG. 10 depicts a mechanism for fetching and dispatching instructions executed by the threads in a system constructed and operated in accord with one practice of the invention.

As noted above, the TPUs 10-20 of module 5 share L1 instruction cache 22, as well as pipeline control hardware that launches up to five instructions each cycle from any combination of the threads active in those TPUs. FIG. 10 is an abstraction of the mechanism employed by module 5 to fetch and dispatch those instructions for execution on functional units 30-38.

As shown in that drawing, during each cycle, instructions are fetched from the L1 cache 22 and placed in instruction queues 10a-20a associated with each respective TPU 10-20. This is referred to as the fetch stage of the cycle. In the illustrated embodiment, three to six instructions are fetch for each single thread, with an overall goal of keeping thread queues 10a-20a at equal levels. In other embodiments, different numbers of instructions may be fetched and/or different goals set for relative filling of the queues. Also during the fetch stage, the module 5 (and, specifically, for example, the event handling mechanisms discussed above) recognize events and transition corresponding threads from waiting to executing.

During the dispatch stage—which executes in parallel with the fetch and execute/retire stages—instructions from each of one or more executing threads are dispatched to the functional units 30-38 based on a round-robin protocol that takes into account best utilization of those resources for that cycle. These instructions can be from any combination of threads. The compiler specifies, e.g., utilizing "stop" flags provided in the instruction set, boundaries between groups of instructions within a thread that can be launched in a single cycle. In other embodiments, other protocols may be employed, e.g., ones that prioritize certain threads, ones that ignore resource utilization, and so forth.

During the execute & retire phase—which executes in parallel with the fetch and dispatch stages—multiple instructions are executed from one or more threads simultaneously. As noted above, in the illustrated embodiment, up to five instructions are launched and executed each cycle, e.g., by the integer, floating, branch, compare and memory functional units 30-38. In other embodiments, greater or fewer instructions can be launched, for example, depending on the number and type of functional units and depending on the number of TPUs.

An instruction is retired after execution if it completes: its result is written and the instruction is cleared from the instruction queue.

Figure 11:
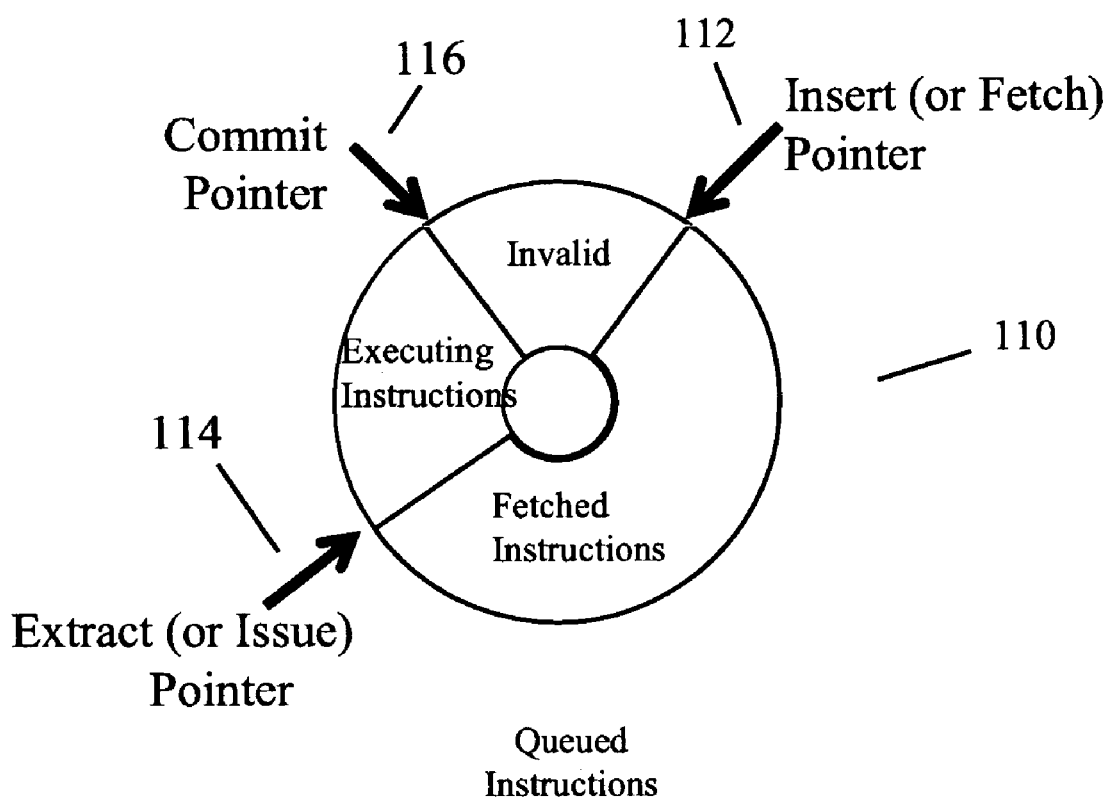
FIGS. 11-12 illustrate a queue management mechanism used in system constructed and operated in accord with one practice of the invention.

On the other hand, if an instruction blocks, the corresponding thread is transitioned from executing to waiting. The blocked instruction and all instructions following it for the corresponding thread are subsequently restarted when the condition that caused the block is resolved. FIG. 11 illustrates a three-pointer queue management mechanism used in the illustrated embodiment to facilitate this.

Referring to that drawing, an instruction queue and a set of three pointers is maintained for each TPU 10-20. Here, only a single such queue 110 and set of pointers 112-116 is shown. The queue 110 holds instructions fetched, executing and retired (or invalid) for the associated TPU—and, more particularly, for the thread currently active in that TPU. As instructions are fetched, they are inserted at the queue's top, which is designated by the Insert (or Fetch) pointer 112. The next instruction for execution is identified by the Extract (or Issue) pointer 114. The Commit pointer 116 identifies the last instruction whose execution has been committed. When an instruction is blocked or otherwise aborted, the Commit pointer 116 is rolled back to quash instructions between Commit and Extract pointers in the execution pipeline. Conversely, when a branch is taken, the entire queue is flushed and the pointers reset.

Figure 12:
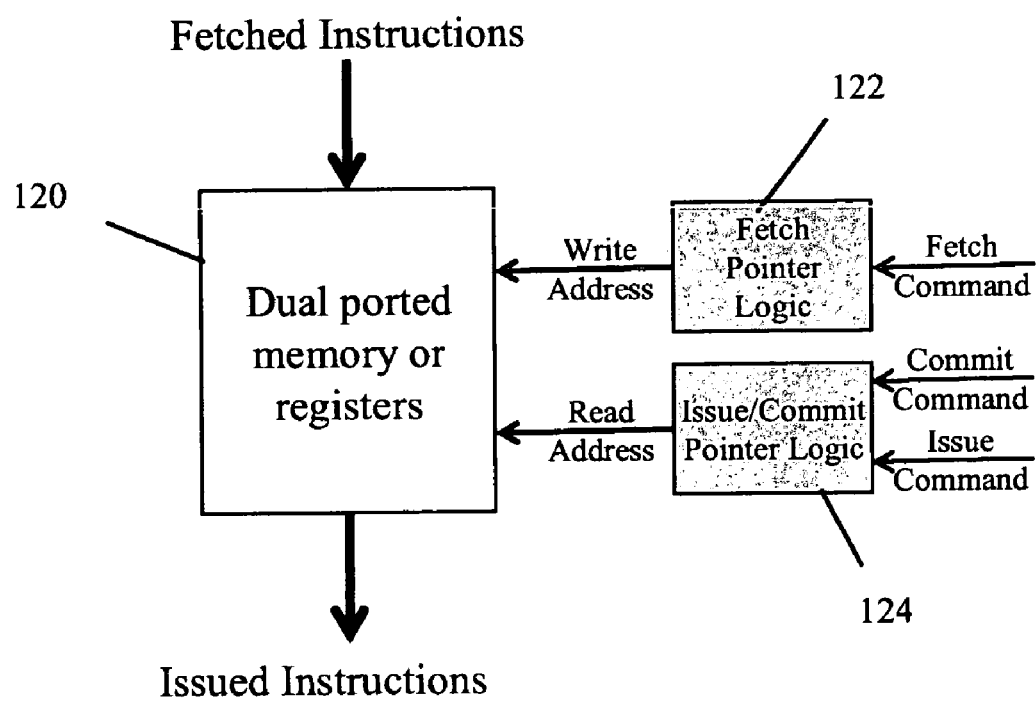

Though the queue 110 is shown as circular, it will be appreciated that other configurations may be utilized as well. The queuing mechanism depicted in FIG. 11 can be implemented, for example, as shown in FIG. 12. Instructions are stored in dual ported memory 120 or, alternatively, in a series of registers (not shown). The write address at which each newly fetched instruction is stored is supplied by Fetch pointer logic 122 that responds to a Fetch command (e.g., issued by the pipeline control) to generate successive addresses for the memory 120. Issued instructions are taken from the other port, here, shown at bottom. The read address from which each instruction is taken is supplied by Issue/Commit pointer logic 124. That logic responds to Commit and Issue commands (e.g., issued by the pipeline control) to generate successive addresses and/or to reset, as appropriate.

Processor Module Implementation

Figure 13:
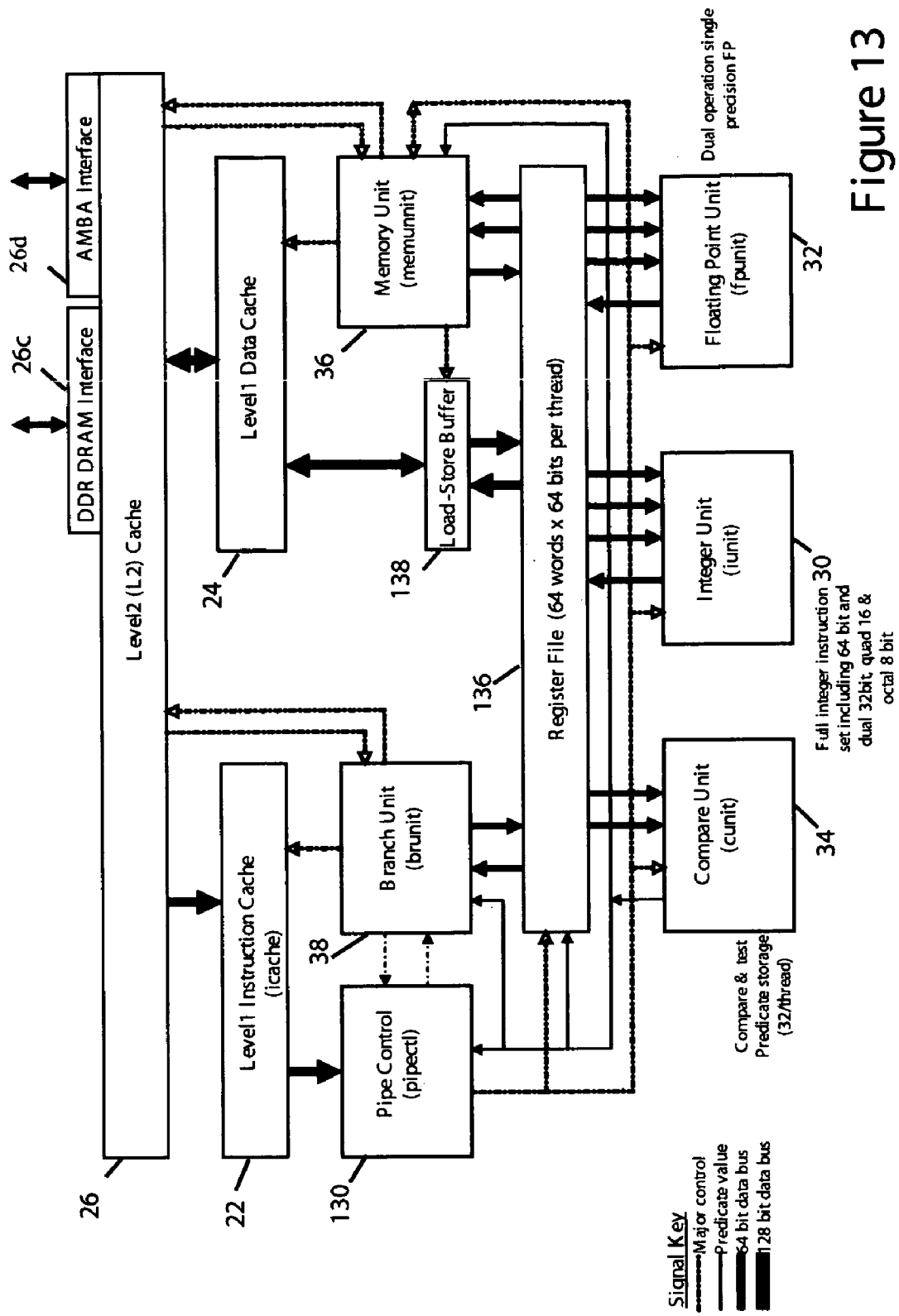
FIG. 13 depicts a system-on-a-chip (SoC) implementation of the processor module of FIG. 1 including logic for implementing thread processing units in accord with one practice of the invention.

FIG. 13 depicts an SoC implementation of the processor module 5 of FIG. 1 including, particularly, logic for implementing the TPUs 10-20. As in FIG. 1, the implementation of FIG. 13 includes L1 and L2 caches 22-26, which are constructed and operated as discussed above. Likewise, the implementation includes functional units 30-34 comprising an integer unit, a floating-point unit, and a compare unit, respectively. Additional functional units can be provided instead or in addition. Logic for implementing the TPUs 10-20 includes pipe-line control 130, branch unit 38, memory unit 36, register file 136 and load-store buffer 138. The components shown in FIG. 13 are interconnected for control and information transfer as shown, with dashed lines indicating major control, thin solid lines indicating predicate value control, thicker solid lines identifying a 64-bit data bus and still thicker lines identifying a 128-bit data bus. It will be appreciated that FIG. 13 represents one implementation of a processor module 5 according to invention and that other implementations may be realized as well.

Pipeline Control Unit

In the illustrated embodiment, pipeline control 130 contains the per-thread queues discussed above in connection with FIGS. 11-12. There can be parameterized at 12, 15 or 18 instructions per thread. The control 130 picks up instructions from those queues on a round robin basis (though, as also noted, this can be performed on other bases as well). It controls the sequence of accesses to the register file 136 (which is the resource which provides source and destination registers for the instructions), as well as to the functional units 30-38. The pipeline control 130 decodes basic instruction classes from the per-thread queues and dispatches instructions to the functional units 30-38. As noted above, multiple instructions from one or more threads can be scheduled for execution by those functional units in the same cycle. The control 130 is additionally responsible for signaling the branch unit 38 as it empties the per-thread construction queues, and for idling the functional units when possible, e.g., on a cycle by cycle basis, to decrease our consumption.

Figure 14:
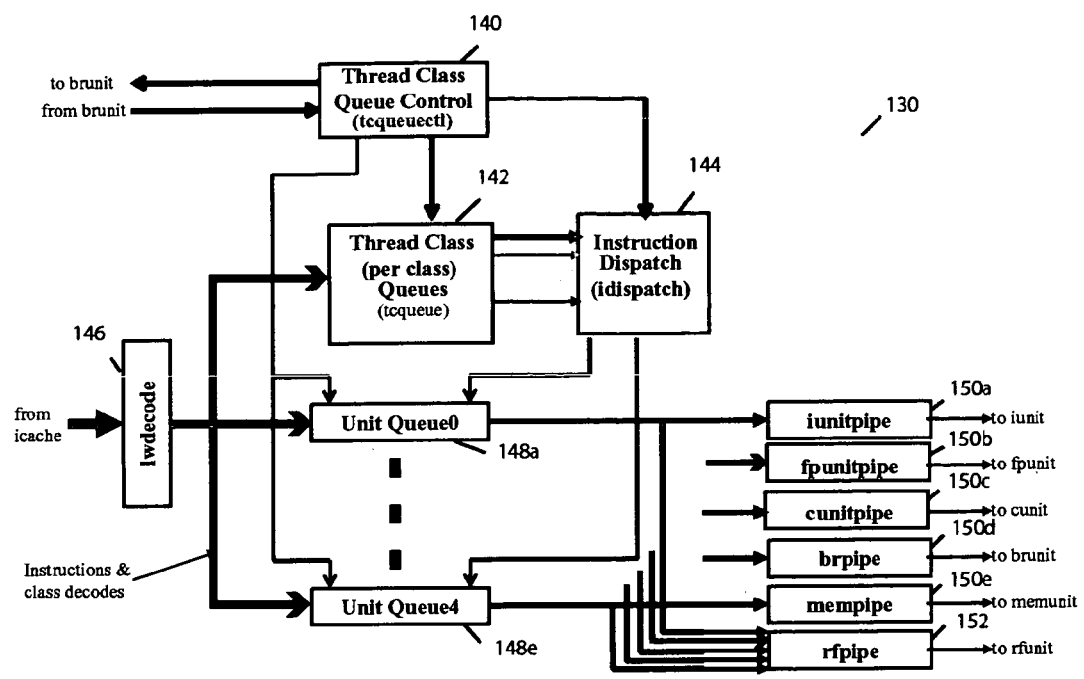
FIG. 14 is a block diagram of a pipeline control unit in a system constructed and operated in accord with one practice of the invention.

FIG. 14 is a block diagram of the pipeline control unit 130. The unit includes control logic 140 for the thread class queues, the thread class (or per-thread) queues 142 themselves, an instruction dispatch 144, a longword decode unit 146, and functional units queues 148a-148e, connected to one another (and to the other components of module 5) as shown in the drawing. The thread class (per-thread) queues are constructed and operated as discussed above in connection with FIGS. 11-12. The thread class queue control logic 140 controls the input side of those queues 142 and, hence, provides the Insert pointer functionality shown in FIGS. 11-12 and discussed above. The control logic 140 is also responsible for controlling the input side of the unit queues 148a-148e, and for interfacing with the branch unit 38 to control instruction fetching. In this latter regard, logic 140 is responsible for balancing instruction fetching in the manner discussed above (e.g., so as to compensate for those TPUs that are retiring the most instructions).

The instruction dispatch 144 evaluates and determines, each cycle, the schedule of available instructions in each of the thread class queues. As noted above, in the illustrated embodiment the queues are handled on a round robin basis with account taken for queues that are retiring instructions more rapidly. The instruction dispatch 144 also controls the output side of the thread class queues 142. In this regard, it manages the Extract and Commit pointers discussed above in connection with FIGS. 11-12, including updating the Commit pointer wind instructions have been retired and rolling that pointer back when an instruction is aborted (e.g., for thread switch or exception).

The longword decode unit 146 decodes incoming instruction longwords from the L1 instruction cache 22. In the illustrated embodiment, each such longword is decoded into the instructions. This can be parameterized for decoding one or two longwords, which decode into three and six instructions, respectively. The decode unit 146 is also responsible for decoding the instruction class of each instruction.

Unit queues 148a-148e queue actual instructions which are to be executed by the functional units 30-38. Each queue is organized on a per-thread basis and is kept consistent with the class queues. The unit queues are coupled to the thread class queue control 140 and to the instruction dispatch 144 for control purposes, as discussed above. Instructions from the queues 148a-148e are transferred to corresponding pipelines 150a-150b en route to the functional units themselves 30-38. The instructions are also passed to the register file pipeline 152.

Figure 15:
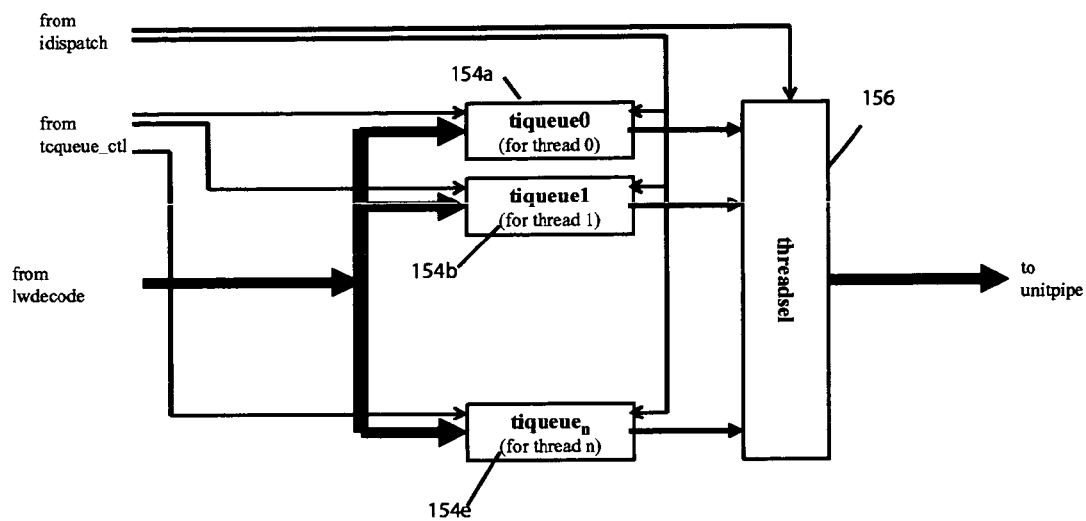
FIG. 15 is a block diagram of an individual unit queue in a system constructed and operated in accord with one practice of the invention.

FIG. 15 is a block diagram of an individual unit queue, e.g., 148a. This includes one instruction queue 154a-154e for each TPU. These are coupled to the thread class queue control 140 (labeled tcqueue_ctl) and the instruction dispatch 144 (labeled idispatch) for control purposes. These are also coupled to the longword decode unit 146 (labeled lwdecode) for instruction input and to a thread selection unit 156, as shown. That unit controls thread selection based on control signals provided by instruction dispatch 144, as shown. Output from unit 156 is routed to the corresponding pipeline 150a-150e, as well as to the register file pipeline 152.

Referring back to FIG. 14, integer unit pipeline 150a and floating-point unit pipeline 150b decode appropriate instruction fields for their respective functional units. Each pipeline also times the commands to that respective functional units. Moreover, each pipeline 150a, 150b applies squashing to the respective pipeline based on branching or aborts. Moreover, each applies a powerdown signal to its respective functional unit when it is not used during a cycle. Illustrated compare unit pipeline 150c, branch unit pipeline 150d, and memory unit pipeline 150e, provide like functionality for their respective functional units, compare unit 34, branch unit 38 and memory unit 36. Register file pipeline 150 also provide like functionality with respect to register file 136.

Figure 16:
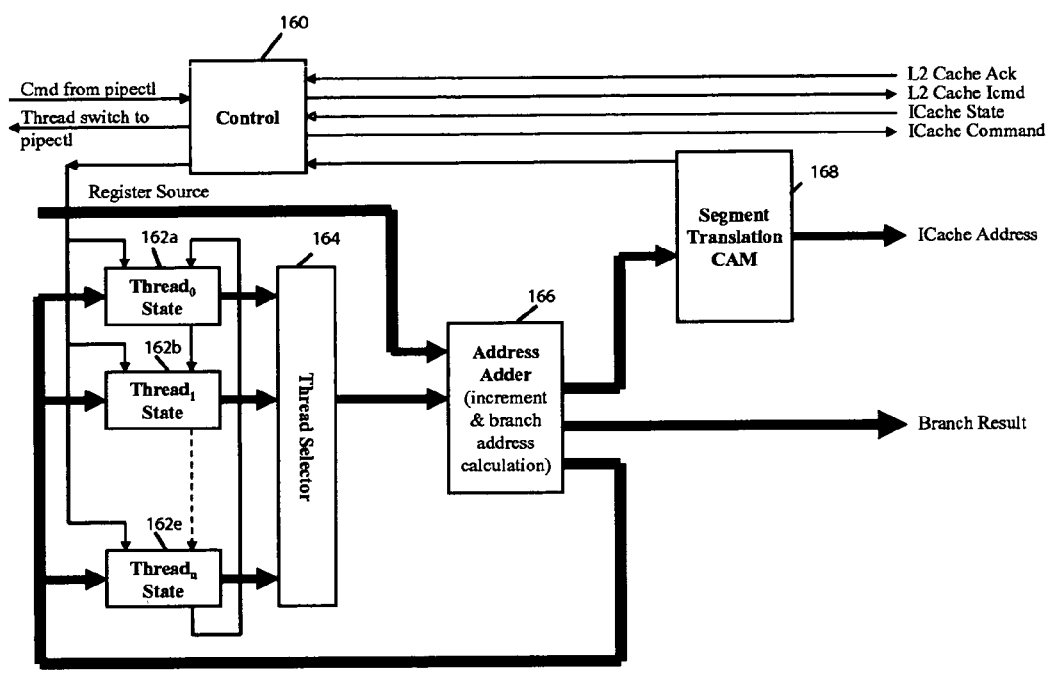
FIG. 16 is a block diagram of the branch unit in a system constructed and operated in accord with one practice of the invention.

Referring, now, back to FIG. 13, illustrated branch unit 38 is responsible for instruction address generation and address translation, as well as instruction fetching. In addition, it maintains state for the thread processing units 10-20. FIG. 16 is a block diagram of the branch unit 38. It includes control logic 160, thread state stores 162a-162e, thread selector 164, address adder 166, segment translation content addressable memory (CAM) 168, connected to one another (and to the other components of module 5) as shown in the drawing.

The control logic drives 160 unit 38 based on a command signal from the pipeline control 130. It also takes as input the instruction cache 22 state and the L2 cache 26 acknowledgment, as illustrated. The logic 160 outputs a thread switch to the pipeline control 130, as well as commands to the instruction cache 22 and the L2 cache, as illustrated. The thread state stores 162a-162e store thread state for each of the respective TPUs 10-20. For each of those TPUs, it maintains the general-purpose registers, predicate registers and control registers shown in FIG. 3 and discussed above.

Address information obtained from the thread state stores is routed to the thread selector, as shown, which selects the thread address from which and address computation is to be performed based on a control signal (as shown) from the control 160. The address adder 166 increments the selected address or performs a branch address calculation, based on output of the thread selector 164 and addressing information supplied by the register file (labelled register source), as shown. In addition, the address adder 166 outputs a branch result. The newly computed address is routed to the segment translation memory 168, which operates as discussed above in connection with FIG. 5, which generates a translated instruction cache address for use in connection with the next instruction fetch.

Functional Units

Figure 17:
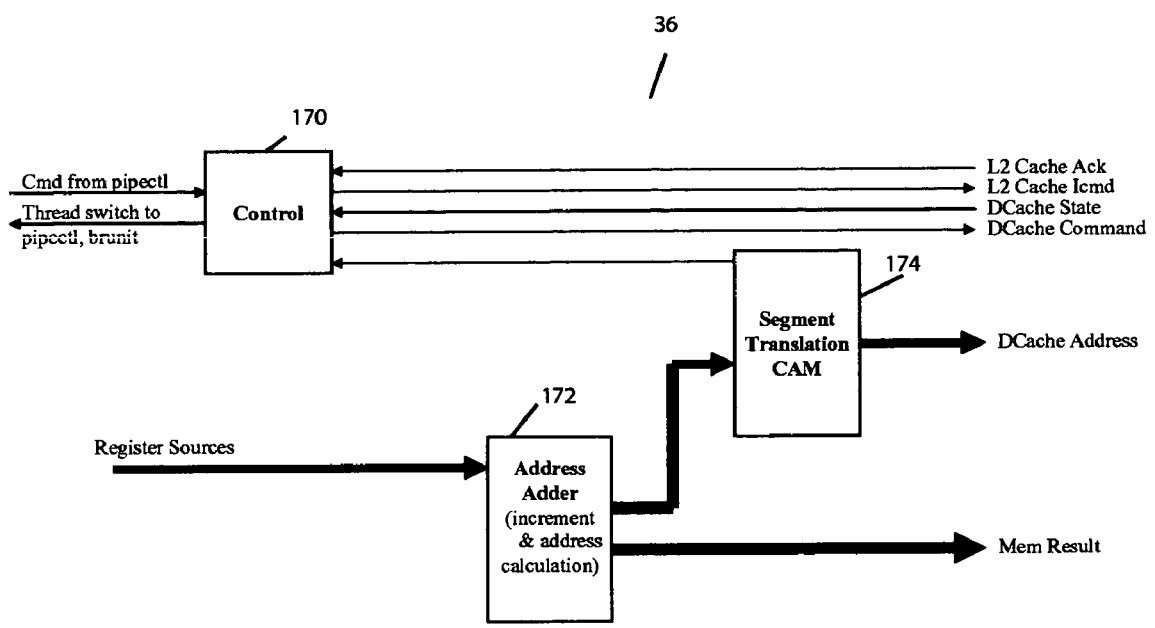
FIG. 17 is a block diagram of a memory unit in a system constructed and operated in accord with one practice of the invention.

Turning back to FIG. 13, memory unit 36 is responsible for memory referents instruction execution, including data cache 24 address generation and address translation. In addition, unit 36 maintains the pending (memory) event table (PET) 50, discussed above. FIG. 17 is a block diagram of the memory unit 36. It includes control logic 170, address adder 172, and segment translation content addressable memory (CAM) 174, connected to one another (and to the other components of module 5) at shown in the drawing.

The control logic drives I/O unit 36 based on a command signal from the pipeline control 130. It also takes as input the data cache 22 state and the L2 cache 26 acknowledgment, as illustrated. The logic 170 outputs a thread switch to the pipeline control 130 and branch unit 38, as well as commands to the data cache 24 and the L2 cache, as illustrated. The address adder 172 increments addressing information provided from the register file 136 or performs a requisite address calculation. The newly computed address is routed to the segment translation memory 174, which operates as discussed above in connection with FIG. 5, which generates a translated instruction cache address for use in connection with a data access. Though not shown in the drawing, the unit 36 also includes the PET, as previously mentioned.

Figure 18:
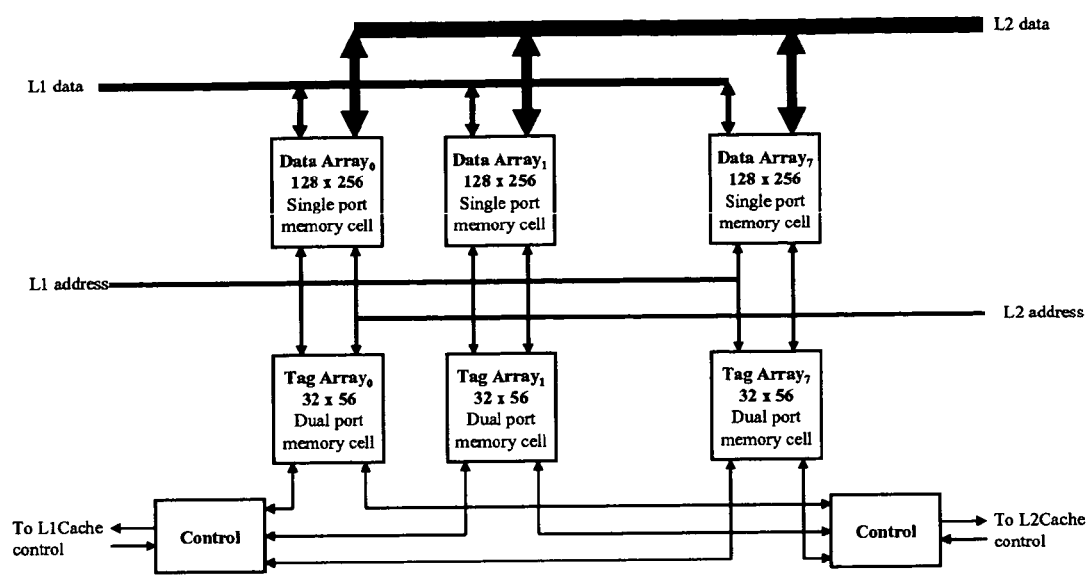
FIG. 18 is a block diagram of a cache unit implementing any of the L1 instruction cache or L1 data cache in a system constructed and operated in accord with one practice of the invention.

FIG. 18 is a block diagram of a cache unit implementing any of the L1 instruction cache 22 or L2 data cache 24. The unit includes sixteen 128×256 byte single port memory cells 180a-180p serving as data arrays, along with sixteen corresponding 32×56 byte dual port memory cells 182a-182p serving as tag arrays. These are coupled to L1 and L2 address and data buses as shown. Control logic 184 and 186 are coupled to the memory cells and to L1 cache control and L2 cache control, also as shown.

Figure 20:
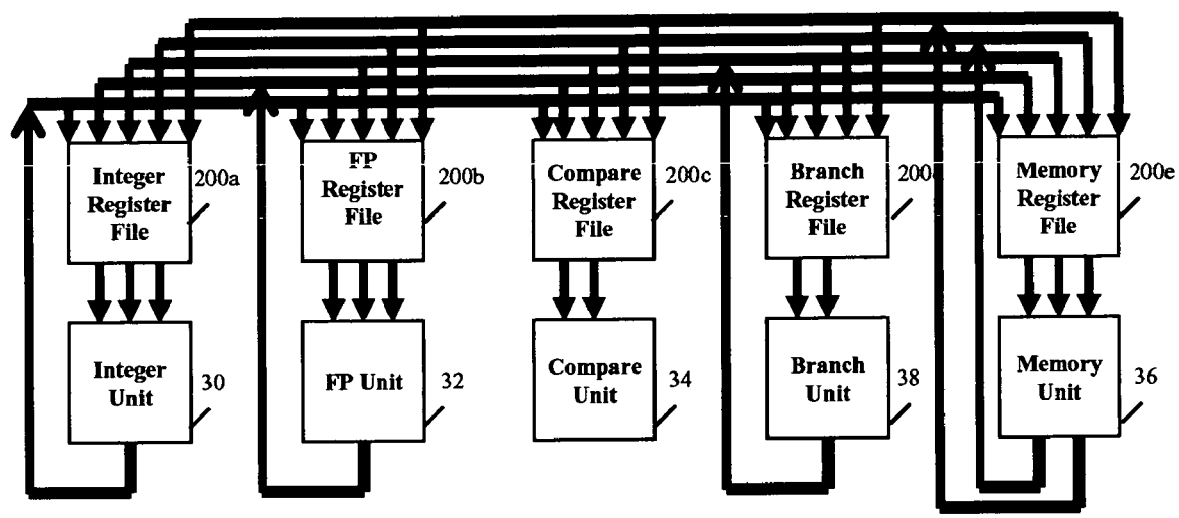
FIG. 20 depicts the implementation of the register file in a system constructed and operated in accord with one practice of the invention.

Returning, again, to FIG. 13, the register file 136 serves as the resource for all source and destination registers accessed by the instructions being executed by the functional units 30-38. The register file is implemented as shown in FIG. 20. As shown there, to reduce delay and wiring overhead, the unit 136 is decomposed into a separate register file instance per functional unit 30-38. In the illustrated embodiment, each instance provides forty-eight 64-bit registers for each of the TPUs. Other embodiments may vary, depending on the number of registers allotted the TPUs, the number of TPUs and the sizes of the registers.

Each instance 200a-200e has five write ports, as illustrated by the arrows coming into the top of each instance, via which each of the functional units 30-38 can simultaneously write output data (thereby insuring that the instances retain consistent data). Each provides a varying number of read ports, as illustrated by the arrows eminating from the bottom of each instance, via which their respective functional units obtain data. Thus, the instances associated with the integer unit 30, the floating point unit 32 and the memory unit all have three read ports, the instance associated with the compare unit 34 has two read ports, and the instance associated with the branch unit 38 has one port, as illustrated.

The register file instances 200-200e can be optimized by having all ports read for a single thread each cycle. In addition, storage bits can be folded under wires to port access.

Figure 21:
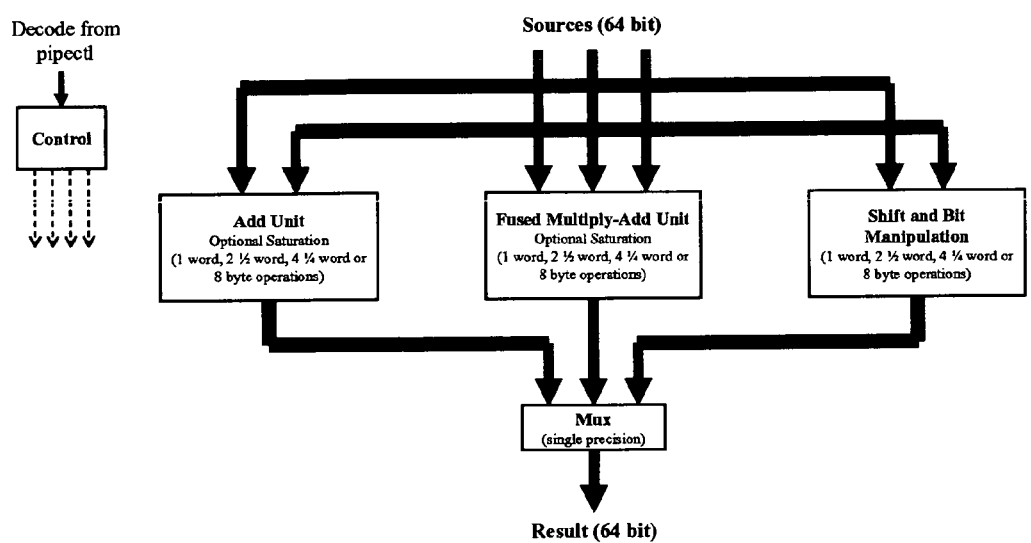
FIGS. 21 and 22 are block diagrams of an integer unit and a compare unit in a system constructed and operated in accord with one practice of the invention.
Figure 22:
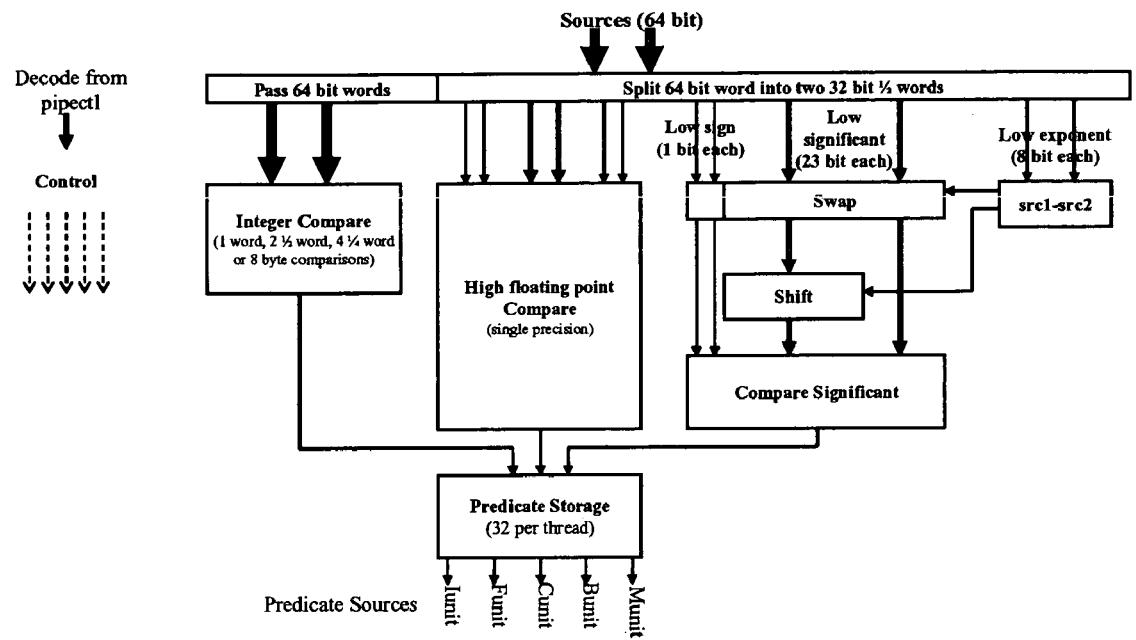
Figure 23A:
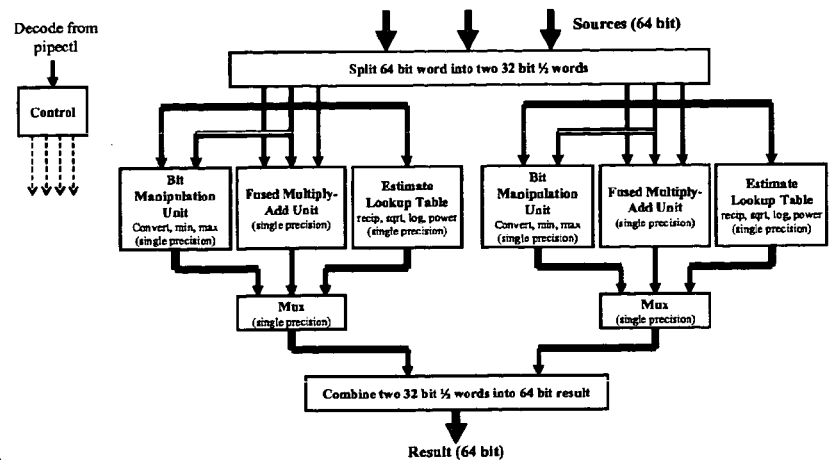
FIGS. 23A and 23B are block diagrams of a floating point unit in a system constructed and operated in accord with one practice of the invention.
Figure 23B:
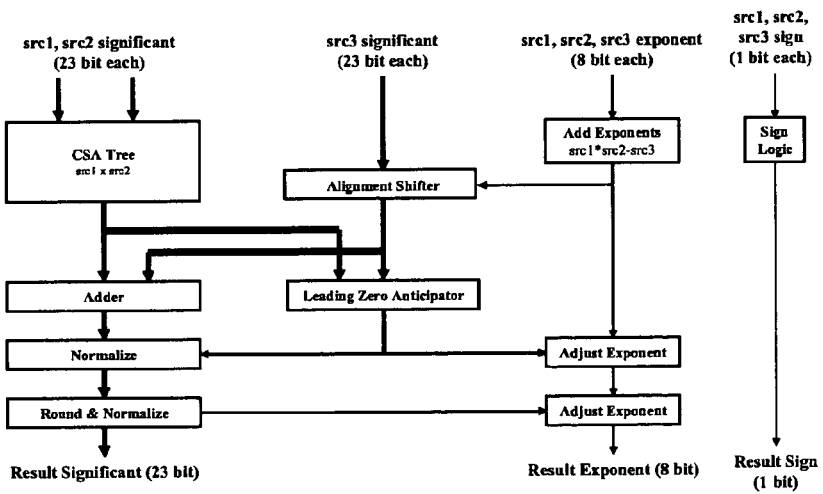

FIGS. 21 and 22 are block diagrams of the integer unit 30 and the compare unit 34, respectively. FIGS. 23A and 23B are block diagrams, respectively, of the floating point unit 32 and the fused multiply-add unit employed therein. The construction and operation of these units is evident from the components, interconnections and labelling supplied with the drawings.

Consumer-Producer Memory

In prior art multiprocessor systems, the synchronization overhead and programming difficulty to implement data-based processing flow between threads or processors (for multiple steps of image processing for example) is very high. The processor module 5 provides memory instructions that permit this to be done easily, enabling threads to wait on the availability of data and transparently wake up when another thread indicates the data is available. Such software transparent consumer-producer memory operations enable higher performance fine grained thread level parallelism with an efficient data oriented, consumer-producer programming style.

The illustrated embodiment provides a "Fill" memory instruction, which is used by a thread that is a data producer to load data into a selected memory location and to associate a state with that location, namely, the "full" state. If the location is already in that state when the instruction is executed, an exception is signalled.

The embodiment also provides an "Empty" instruction, which is used by a data consumer to obtain data from a selected location. If the location is associated with the full state, the data is read from it (e.g., to a designated register) and the instruction causes the location to be associated with an "empty" state. Conversely, if the location is not associated with the full state at the time the Empty instruction is executed, the instruction causes the thread that executed it to temporarily transition to the idle (or, in an alternative embodiment, an active, non-executing) state, re-transitioning it back to the active, executing state—and executing the Empty instruction to completion—once it is becomes so associated. Using the Empty instruction enables a thread to execute when its data is available with low overhead and software transparency.

In the illustrated embodiment, it is the pending (memory) event table (PET) 50 that stores status information regarding memory locations that are the subject of Fill and Empty operations. This includes the addresses of those locations, their respective full or empty states, and the identities of the "consumers" of data for those locations, i.e., the threads that have executed Empty instructions and are waiting for the locations to fill. It can also include the identities of the producers of the data, which can be useful, for example, in signalling and tracking causes of exceptions (e.g., as where to successive Fill instructions are executed for the same address, with no intervening Empty instructions).

The data for the respective locations is not stored in the PET 50 but, rather, remains in the caches and/or memory system itself, just like data that is not the subject of Fill and/or Empty instructions. In other embodiments, the status information is stored in the memory system, e.g., alongside the locations to which it pertains and/or in separate tables, linked lists, and so forth.

Thus, for example, when an Empty instruction is executed on a given memory location, the PET is checked to determine whether it has an entry indicating that same location is currently in the full state. If so, that entry is changed to empty and a read is effected, moving data from the memory location to the register designated by the Empty instruction.

If, on the other hand, when the Empty instruction is executed, there no entry in the PET for the given memory location (or if any such entry indicates that the location is currently empty) then an entry is created (or updated) in the PET to indicate that the given location is empty and to indicate that the thread which executed the Empty instruction is a consumer for any data subsequently stored to that location by a Fill instruction.

When a Fill instruction is subsequently executed (presumably, by another thread), the PET is checked is checked to determine whether it has an entry indicating that same location is currently in the empty state. Upon finding such an entry, its state is changed to full, and the event delivery mechanism 44 (FIG. 4) is used to route a notification to the consumer-thread identified in that entry. If that thread is in an active, waiting state in a TPU, the notification goes to that TPU, which enters active, executing state and reexecutes the Empty instruction—this time, to completion (since the memory location is now in the full state). If that thread is in the idle state, the notification goes to the system thread (in whatever TPU it is currently executing), which causes the thread to be loaded into a TPU in the executing, active state so that the Empty instruction can be reexecuted.

In the illustrated embodiment, this use of the PET for consumer/producer-like memory operations is only effected with respect to selected memory instructions, e.g., Fill and Empty, but not with the more conventional Load and Store memory instructions. Thus, for example, even if a Load instruction is executed with respect to a memory location that is currently the subject of an Empty instruction, no notification is made to the thread that executed that Empty instruction so that the instruction can be reexecuted. Other embodiments may vary in this regard.

Figure 24A:
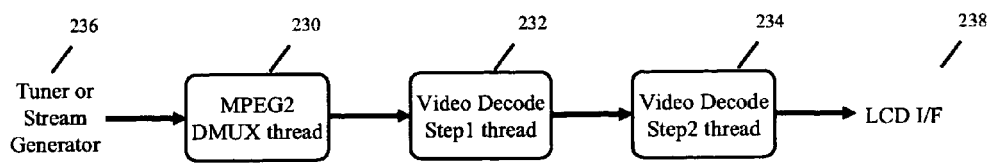
FIGS. 24A and 24B illustrate use of consumer and producer memory instructions in a system constructed and operated in accord with one practice of the invention.

FIGS. 24A depicts three interdependent threads, 230, 232 and 234, the synchronization of and data transfer between which can be facilitated by Fill and Empty instructions according to the invention. By way of example, thread 230 is an MPEG2 demultiplexing thread 230, responsible for demultiplexing an MPEG2 signal obtained, for example, from an MPEG2 source 236, e.g., a tuner, a streaming source or otherwise. It is assumed to be in an active, executing state on TPU 10, to continue the example. Thread 232 is a video decoding Step 1 thread, responsible for a first stage of decoding a video signal from a demultiplexed MPEG2 signal. It is assumed to be in an active, executing state on TPU 12. Thread 234 is a video decoding Step 2 thread, responsible for a second stage of decoding a video signal from a demultiplexed MPEG2 signal for output via an LCD interface 238 or other device. It is assumed to be in an active, executing state on TPU 14.

Figure 24B:
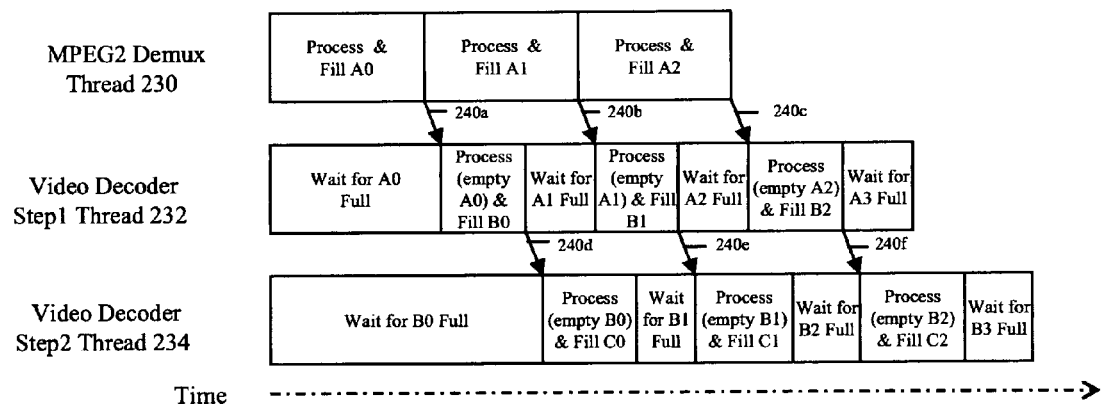

To accommodate data streaming from the source 236 in real-time, each of the threads 230-234 continually process data provided by its upstream source and does so in parallel with the other threads. FIG. 24B illustrates use of the Fill and Empty instructions to facilitate this in a manner which insures synchronization and facilitates data transfer between the threads.

Referring to the drawing, arrows 240a-240g indicate fill dependencies between the threads and, particularly, between data locations written to (filled) by one thread and read from (emptied) by another thread. Thus, thread 230 processes data destined for address A0, while thread 232 executes an Empty instruction targeted to that location and thread 234 executes an Empty instruction targeted to address B0 (which thread 232 will ultimately Fill). As a result of the Empty instructions, thread 232 enters a wait state (e.g., active, non-executing or idle) while awaiting completion of the Fill of location A0 and thread 234 enters a wait state while awaiting completion of the Fill of location B0.

On completion of thread 230's Fill of A0, thread 232's Empty completes, allowing that thread to process the data from A0, with the result destined for B0 via a Fill instruction. Thread 234 remains in a wait state, still awaiting completion of that Fill. In the meanwhile, thread 230 begins processing data destined for address A1 and thread 232 executes the Empty instruction, placing it in a wait state while awaiting completion of the Fill of A1.

When thread 232 executes the Fill demand for B0, thread 234's Empty completes allowing that thread to process the data from B0, with the result destined for C0, whence it is read by the LCD interface (not shown) for display to the TV viewer. The three threads 230, 232, 234 continue process and executing Fill and Empty instruction in this manner—as illustrated in the drawing—until processing of the entire MPEG2 stream is completed.

A further appreciation of the Fill and Empty instructions may be attained by review of their instruction formats.

Empty
Format: ps EMPTY.cache.threads dreg, breg, ireg {,stop}
Description: Empty instructs the memory system to check the state of the effective address. If the state is full, empty instruction changes the state to empty and loads the value into dreg. If the state is already empty, the instruction waits until the instruction is full, with the waiting behavior specified by the thread field.
Operands and Fields:

| | |
|---|---|
| ps | The predicate source register that specifies whether the instruction is executed. If true the instruction is executed, else if false the instruction is not executed (no side effects). |
| stop | 0 Specifies that an instruction group is not delineated by this instruction. <br> 1 Specifies that an instruction group is delineated by this instruction. |
| thread | 0 unconditional, no thread switch <br> 1 unconditional thread switch <br> 2 conditional thread switch on stall (block execution of thread) <br> 3 reserved |
| scache | 0 tbd with reuse cache hint <br> 1 read/write with reuse cache hint <br> 2 tbd with no-reuse cache hint <br> 3 read/write with no-reuse cache hint |
| im | 0 Specifies index register (ireg) for address calculation <br> 1 Specifies disp for address calculation |
| ireg | Specifies the index register of the instruction. |
| breg | Specifies the base register of the instruction. |
| disp | Specifies the two-s complement displacement constant (8-bits) for memory reference instructions |
| dreg | Specifies the destination register of the instruction. |

Fill
Format: ps FILL.cache.threads s1reg, breg, ireg {,stop}
Description: Register s1reg is written to the word in memory at the effective address. The effective address is calculated by adding breg (base register) and either ireg (index register) or disp (displacement) based on the im (immediate memory) field. The state of the effective address is changed to full. If the state is already full an exception is signaled.
Operands and Fields:

| | |
|---|---|
| ps | The predicate source register that specifies whether the instruction is executed. If true the instruction is executed, else if false the instruction is not executed (no side effects). |
| stop | 0 Specifies that an instruction group is not delineated by this instruction. <br> 1 Specifies that an instruction group is delineated by this instruction. |
| thread | 0 unconditional, no thread switch <br> 1 unconditional thread switch <br> 2 conditional thread switch on stall (block execution of thread) <br> 3 reserved |
| scache | 0 tbd with reuse cache hint <br> 1 read/write with reuse cache hint <br> 2 tbd with no-reuse cache hint <br> 3 read/write with no-reuse cache hint |
| im | 0 Specifies index register (ireg) for address calculation <br> 1 Specifies disp for address calculation |
| ireg | Specifies the index register of the instruction. |
| breg | Specifies the base register of the instruction. |
| disp | Specifies the two-s complement displacement constant (8-bits) for memory reference instructions |
| s1reg | Specifies the register that contains the first operand of the instruction. |

Software Events

A more complete understanding of the processing of hardware and software events may be attained by review of their instruction formats:

Event

Format: ps EVENT s1reg{,stop}

Description: The EVENT instruction polls the event queue for the executing thread. If an event is present the instruction completes with the event status loaded into the exception status register. If no event is present in the event queue, the thread transitions to idle state.

Operands and Fields:

| | |
|---|---|
| ps | The predicate source register that specifies whether the instruction is executed. If true the instruction is executed, else if false the instruction is not executed (no side effects). |
| stop | 0 Specifies that an instruction group is not delineated by this instruction.<br>1 Specifies that an instruction group is delineated by this instruction. |
| s1reg | Specifies the register that contains the first source operand of the instruction. |

SW Event

Format ps SWEVENT s1reg {,stop}

Description: The SWEvent instruction en-queues an event onto the Event Queue to be handled by a thread. See xxx for the event format.

Operands and Fields:

| | |
|---|---|
| ps | The predicate source register that specifies whether the instruction is executed. If true the instruction is executed, else if false the instruction is not executed (no side effects). |
| stop | 0 Specifies that an instruction group is not delineated by this instruction.<br>1 Specifies that an instruction group is delineated by this instruction. |
| s1reg | Specifies the register that contains the first source operand of the instruction. |

CtlFLD

Format: ps.CtlFld.ti cfield, {,stop}

Description: The Control Field instruction modifies the control field specified by cfield. Other fields within the control register are unchanged.

Operands and Fields:

| | |
|---|---|
| ps | The predicate source register that specifies whether the instruction is executed. If true the instruction is executed, else if false the instruction is not executed (no side effects). |
| stop | 0 Specifies that an instruction group is not delineated by this instruction.<br>1 Specifies that an instruction group is delineated by this instruction. |
| ti | 0 Specifies access to this threads control registers.<br>1 Specifies access to control register of thread specified by ID.t_indirect field. (thread indirection) (privileged) |
| cfield | cfield[4:0] control field privilege |

| | | | |
|---|---|---|---|
| 000nn | Thread state | | application |
| | nn | value | |
| | 00 | idle | |
| | 01 | reserved | |
| | 10 | waiting | |
| | 11 | executing | |
| 0010S | System trap enable | | system |
| 0011S | Application trap enable | | application |
| 0100S | Thread Enable | | system |
| 0101S | Privilege Level | | System |
| 0110S | Registers Modified | | application |
| 0111S | Instruction address translation enable | | system |
| 1000S | Data address translation enable | | system |
| 1001S | Alignment Check | | System |
| 1010S | Endian Mode | | system |
| 1011S | reserved | | |
| 11**S | | | |

S = 0 clear,
S = 1 set

Devices Incorporating Processor Module 5

Figure 25:
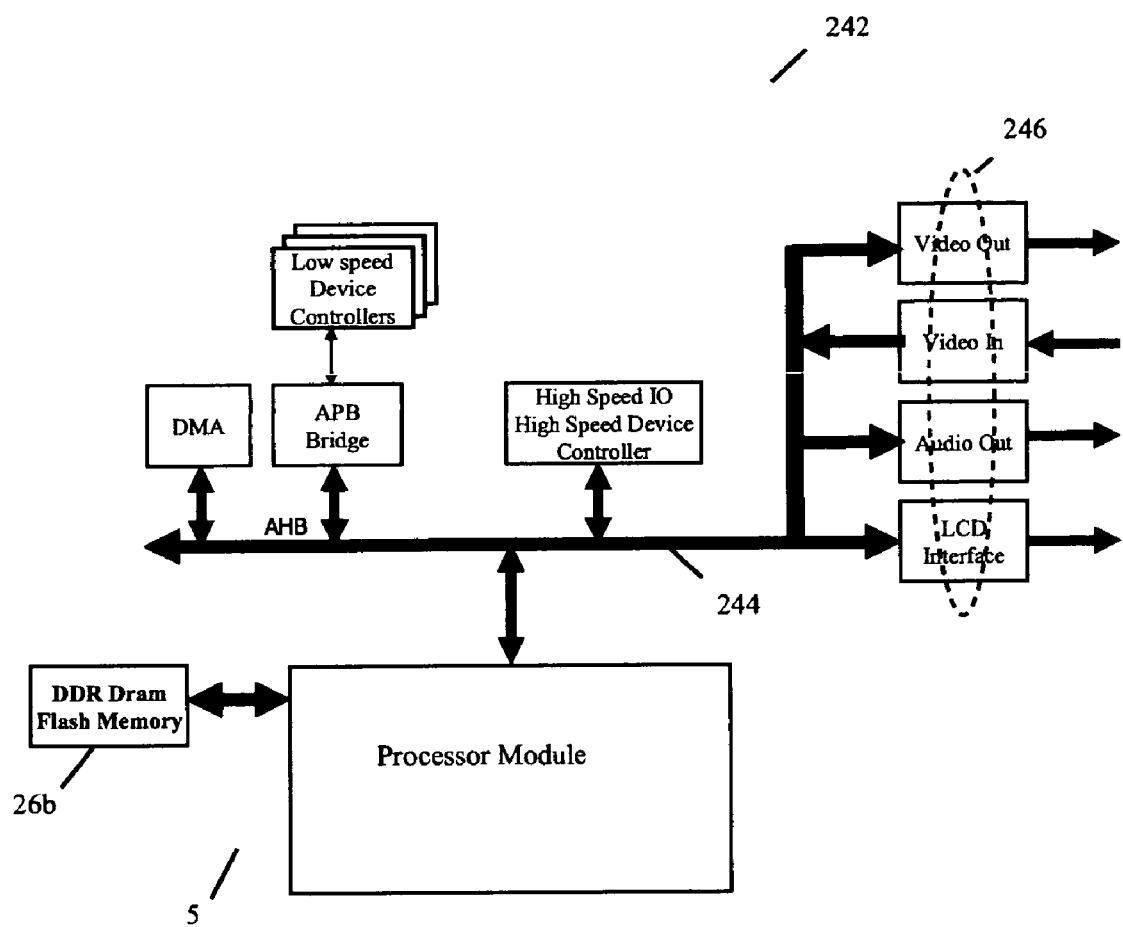
FIG. 25 is a block diagram of a digital LCD-TV subsystem in a system constructed and operated in accord with one practice of the invention.

FIG. 25 is a block diagram of a digital LCD-TV subsystem 242 according to the invention embodied in a SoC format. The subsystem 242 includes a processor module 5 constructed as described above and operated to execute simultaneously execute threads providing MPEG2 signal demultiplexing, MPEG2 video decoding, MPEG audio decoding, digital-TV user interface operation, and operating system execution (e.g,. Linux), e.g., as described above. The module 5 is coupled to DDR DRAM flash memory comprising the off-chip portion of the L2 cache 26, also as discussed above. The module includes an interface (not shown) to an AMBA AHB bus 244, via which it communicates with "intellectual property" or "IP" 246 providing interfaces to other components of the digital LCD-TV, namely, a video input interface, a video output interface, an audio output interface and LCD interface. Of course other IP may be provided in addition or instead, coupled to the module 5 via the AHB bus 5 or otherwise. For example, in the drawing, illustrated module 5 communicates with optional IP via which the digital LCD-TV obtains source signals and/or is controlled, such as DMA engine 248, high speed I/O device controller 250 and low speed device controllers 252 (via APB bridge 254) or otherwise.

Figure 26:
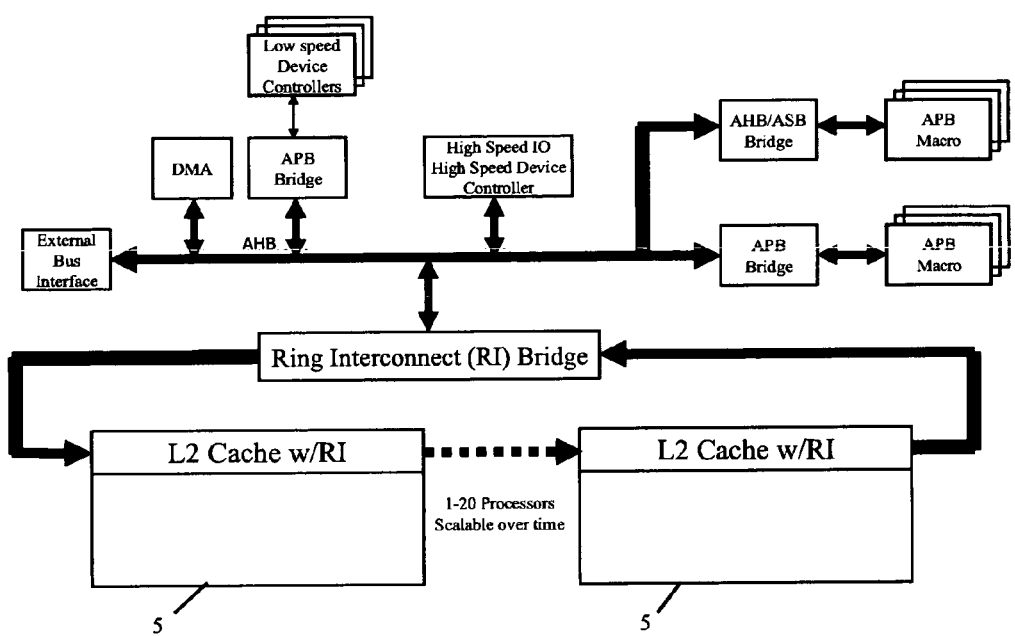
FIG. 26 is a block diagram of a digital LCD-TV or other application subsystem in a system constructed and operated in accord with one practice of the invention.

FIG. 26 is a block diagram of a digital LCD-TV or other application subsystem 256 according to the invention, again, embodied in a SoC format. The illustrated subsystem is configured as above, except insofar as it is depicted with APB and AHB/APB bridges and APB macros 258 in lieu of the specific IP shown 246 shown in FIG. 24. Depending on application needs, elements 258 may comprise a video input interface, a video output interface, an audio output interface and an LCD interface, as in the implementation above, or otherwise.

The illustrated subsystem further includes a plurality of modules 5, e.g., from one to twenty such modules (or more) that are coupled via an interconnect that interfaces with and, preferably, forms part of the off-chip L2 cache 26b utilized by the modules 5. That interconnect may be in the form of a ring interconnect (RI) comprising a shift register bus shared by the modules 5 and, more particularly, by the L2 caches 26. Alternatively, it may be an interconnect of another form, proprietary or otherwise, that facilitates the rapid movement of data within the combined memory system of the modules 5. Regardless, the L2 caches are preferably coupled so that the L2 cache for any one module 5 is not only the memory system for that individual processor but also contributes to a distributed all cache memory system for all of the processor modules 5. Of course, as noted above, the modules 5 do not have to physically sharing the same memory system, chips or buses and could, instead, be connected over a network or otherwise.

Described above is are apparatus, systems and methods meeting the desired objects. It will be appreciated that the embodiments described herein are examples of the invention and that other embodiments, incorporating changes therein, fall within the scope of the invention, of which we claim:

The invention claimed is:

1. An embedded processor, comprising
   A. a plurality of processing units, each of which execute one or more processes or threads (which one or more processes or threads are collectively referred to as "threads") and one or more of which execute a plurality of threads,
   B. one or more execution units that are shared by, and in communication coupling with, the plurality of processing units, the execution units executing instructions from the threads,
   C. an event delivery mechanism that delivers events to respective threads with which those events are associated, wherein a said event is any of (i) a hardware interrupt generated other than by the processing unit that is executing the thread to which that hardware interrupt is delivered, (ii) a software interrupt generated other than by the thread to which that software interrupt is delivered, wherein the event delivery mechanism
      i. is in communication coupling with the plurality of processing units, and
      ii. delivers each such event to the respective thread without execution of instructions by said processing units.

2. The embedded processor of claim 1, wherein the thread to which an event is delivered processes that event without execution of instructions outside that thread.

3. The embedded processor of claim 1, wherein the execution units execute instructions from the threads without need to know what thread they are from.

4. The embedded processor of claim 1, wherein each thread is any of constrained or not constrained to execute on a same processing unit during a life of that thread.

5. The embedded processor of claim 1, wherein at least one of the processing units is a virtual processing unit.

6. An embedded processor, comprising
   A. a plurality of virtual processing units, each executing one or more processes or threads (which one or more processes or threads are collectively referred to as "threads"), wherein each thread is any of constrained or not constrained to execute on a same processing unit during a life of that thread,
   B. a plurality of execution units,
   C. a pipeline control that is in communication coupling with the plurality of processing units and with the plurality of execution units, the pipeline control launching instructions from plural ones of the threads for concurrent execution on plural ones of the execution units,
   D. an event delivery mechanism that is in communication coupling with the plurality of processing units and that delivers events to respective threads with which those events are associated without execution of instructions by said processing units, where the events include any of (i) a hardware interrupt generated other than by the processing unit that is executing the thread to which that hardware interrupt is delivered, (ii) a software interrupt generated other than by the thread to which that software interrupt is delivered,
   E. wherein a thread to which such an event is delivered processes that event without execution of instructions outside that thread.

7. The embedded processor of claim 6, where the pipeline control comprises a plurality of instruction queues, each associated with a respective virtual processing unit.

8. The embedded processor of claim 7, where the pipeline control decodes instruction classes from the instruction queues.

9. The embedded processor of claim 7, where the pipeline control controls access by the processing units to a resource providing source and destination registers for the instructions dispatched from the instruction queues.

10. The embedded processor of claim 7, wherein the execution units include a branch execution unit responsible for any of instruction address generation, address translation and instruction fetching.

11. The embedded processor of claim 10, wherein the branch execution unit maintains state for the virtual processing units.

12. The embedded processor of claim 6, where the pipeline control controls access by the virtual processing units to the execution units.

13. The embedded processor of claim 6, where the pipeline control signals a branch execution unit that is shared by the virtual processing unit as the instruction queue for each virtual processing unit is emptied.

14. The embedded processor of claim 6, where the pipeline control idles the execution units to decrease power consumption.

15. The embedded processor of claim 6, wherein the plurality of execution units include any of integer, floating, branch, compare and memory units.

16. An embedded processor system, comprising
    A. a plurality of embedded processors,
    B. a plurality of virtual processing units executing on the plurality of embedded processors, each virtual processing executing one or more processes or threads (which one or more processes or threads are collectively referred to as "threads") such that one or more embedded processors has plural threads executing thereon, each thread being any of constrained or not constrained to execute on a same virtual processing unit and/or a same processor during a life of that thread,
    C. one or more execution units that are shared by, and in communication coupling with, the plurality of virtual processing units, the execution units executing instructions from the threads, the execution units including any of integer, floating, branch, compare and memory execution units,
    D. an event delivery mechanism that delivers events to respective threads with which those events are associated, wherein a said event is any of (i) a hardware interrupt generated other than by the processing unit that is executing the thread to which that hardware interrupt is delivered, (ii) a software interrupt generated other than by the thread to which that software interrupt is delivered, wherein the event delivery mechanism
       i. is in communication coupling with the plurality of virtual processing units, and
       ii. delivers each such event to the respective thread without execution of instructions by said virtual processing units.

17. The embedded processor system of claim 16, wherein the thread to which an event is delivered processes that event without execution of instructions outside that thread.

18. The embedded processor system of claim 17, wherein the branch unit is responsible for fetching instructions that are to be executed for the threads.

19. The embedded processor system of claim 18, wherein the branch unit is additionally responsible for any of instruction address generation and address translation.

20. The embedded processor system of claim 19, wherein the branch unit comprises thread state stores that store thread state for each of the respective virtual processing units.

21. The embedded processor system of claim 17, comprising
   A. a pipeline control that is in communication coupling with the plurality of processing units and with the plurality of execution units, the pipeline control dispatching instructions from plural ones of the threads for concurrent execution on plural ones of the execution units,
   B. the pipeline control comprises a plurality of instruction queues, each associated with a respective virtual processing unit, and wherein
   C. instructions fetched by the branch execution unit are placed in the instruction queues associated with the respective virtual processing unit in which the corresponding thread is executed.

22. The embedded processor system of claim 21, wherein one or more instructions are fetched at a time for a said thread with a goal of keeping the instructions queues at equal levels.

23. The embedded processor system of claim 22, wherein the pipeline control dispatches one or more instructions at a time from a given instruction queue for execution.

24. The embedded processor system of claim 23, wherein a number of instructions dispatched by the pipeline control at a given time from a given instruction queue is controlled by a stop flag in a sequence of instructions in that queue.

25. The embedded processor system of claim 21, wherein the pipeline control launches, and the execution units execute, multiple instructions from one or more threads simultaneously.

26. An embedded processor, comprising
   A. a plurality of processing units, each of which execute one or more processes or threads (which one or more processes or threads are collectively referred to as "threads") and one or more of which execute a plurality of threads,
   B. an event delivery mechanism that delivers events to respective threads with which those events are associated, wherein a said event is any of (i) a hardware interrupt generated other than by the processing unit that is executing the thread to which that hardware interrupt is delivered, (ii) a software interrupt generated other than by the thread to which that software interrupt is delivered, and wherein the event delivery mechanism
      i. is in communication coupling with the plurality of processing units, and
      ii. delivers each such event to the respective thread without execution of instructions by said processing units.

27. The embedded processor of claim 26, wherein the thread to which an event is delivered processes that event without execution of instructions outside that thread.

28. The embedded processor of claim 26, wherein each thread is any of constrained or not constrained to execute on a same processing unit during a life of that thread.

29. The embedded processor of claim 26, wherein at least one of the processing units is a virtual processing unit.

30. An embedded processor system, comprising
   A. a plurality of embedded processors,
   B. a plurality of virtual processing units executing on the plurality of embedded processors, each virtual processing executing one or more processes or threads (which one or more processes or threads are collectively referred to as "threads") such that one or more embedded processors has plural threads executing thereon,
   C. an event delivery mechanism that delivers events to respective threads with which those events are associated, wherein a said event is any of (i) a hardware interrupt generated other than by the processing unit that is executing the thread to which that hardware interrupt is delivered, (ii) a software interrupt generated other than by the thread to which that software interrupt is delivered, and wherein the event delivery mechanism
      i. is in communication coupling with the plurality of virtual processing units, and
      ii. delivers each such event to the respective thread without execution of instructions by said virtual processing units.

31. The embedded processor system of claim 30, wherein the thread to which an event is delivered processes that event without execution of instructions outside that thread.

32. The embedded processor system of claim 31, wherein each thread is any of constrained or not constrained to execute on a same processing unit during a life of that thread.

33. A method of embedded processing, comprising the steps of
   A. executing one or more processes or threads (which one or more processes or threads are collectively referred to as "threads") on each of a plurality of processing units, such that plural threads are executing on one or more of those processing units,
   B. executing instructions from the threads in one or more execution units that are shared by the plurality of processing units,
   C. delivering events to respective threads with which those events are associated, wherein a said event is any of (i) a hardware interrupt generated other than by the processing unit that is executing the thread to which that hardware interrupt is delivered, (ii) a software interrupt generated other than by the thread to which that software interrupt is delivered
   D. wherein step (C) is effected without executing instructions by said processing units.

34. The method of claim 33, comprising the step of processing the event by the thread to which the event is delivered without execution of instructions outside that thread.

35. The method of claim 33, wherein the step of executing instructions from the threads in one or more execution units does not necessitate the execution units knowing what threads the respective instructions are from.

36. The method of claim 33, wherein each thread is any of constrained or not constrained to execute on a same processing unit during a life of that thread.

37. The method of claim 33, wherein at least one of the processing units is a virtual processing unit.

38. A method of embedded processing, comprising the steps of
   A. executing one or more processes or threads (which one or more processes or threads are collectively referred to as "threads") on each of a plurality of virtual processing units, wherein each thread is any of constrained or not constrained to execute on a same processing unit during a life of that thread,
   B. launching instructions from plural ones of the threads for concurrent execution on a plurality of execution units,
   C. delivering events to respective threads with which those events are associated without execution of instructions by said virtual processing units, where the events include any of (i) a hardware interrupt generated other than by the processing unit that is executing the thread to which that hardware interrupt is delivered, (ii) a software interrupt generated other than by the thread to which that software interrupt is delivered, and D. processing the event to which the thread is delivered without execution of instructions outside that thread.

39. The method of claim 38, where the launching step includes decoding instruction classes from the instruction queues.

40. The method of claim 38, where the launching step includes controlling access by the virtual processing units to a resource providing source and destination registers for the instructions dispatched from the instruction queues.

41. The method of claim 38, comprising executing any of the steps of instruction address generation, address translation and instruction fetching using a branch execution unit that is shared by all of the virtual processing units.

42. The method of claim 41, comprising maintaining state for the virtual processing units using the branch execution unit.

43. The method of claim 38, wherein the execution units include any of integer, floating, branch, compare and memory units.

44. A method of embedded processing, comprising the steps of
A. executing a plurality of virtual processing units on a plurality of embedded processors,
B. executing one or more processes or threads (which one or more processes or threads are collectively referred to as "threads") on each of a plurality of virtual processing units such that one or more embedded processors has plural threads executing thereon, each thread being any of constrained or not constrained to execute on a same virtual processing unit and/or a same embedded processor during a life of that thread,
C. executing instructions from the threads in one or more execution units that are shared by the plurality of virtual processing units, the execution units including any of integer, floating, branch, compare and memory execution units, and
D. delivering events to respective threads with which those events are associated without execution of instructions by said virtual processing units, wherein a said event is any of (i) a hardware interrupt generated other than by the processing unit that is executing the thread to which that hardware interrupt is delivered, (ii) a software interrupt generated other than by the thread to which that software interrupt is delivered, and
E. wherein step (D) is effected without executing instructions by said processing units.

45. The method of claim 44, comprising processing the event by the thread to which the event is delivered without execution of instructions outside that thread.

46. The method of claim 45, comprising fetching instructions that are to be executed for the threads using the branch execution unit.

47. The method of claim 46, comprising executing with the branch execution unit any of instruction address generation and address translation.

48. The method of claim 45, comprising
A. dispatching instructions from plural ones of the threads for concurrent execution on plural ones of the execution units,
B. the dispatching step including placing instructions fetched for each of the respective threads in instruction queues associated with the virtual processing units in which that thread is executed.

49. The method of claim 48, wherein the dispatching step includes fetching one or more instructions at a time for a given thread with a goal of keeping the instructions queues at equal levels.

50. The method of claim 49, wherein the dispatching step includes dispatching one or more instructions at a time from a given instruction queue for execution by the execution units.

51. The method of claim 50, wherein a number of instructions dispatched by the pipeline control at a given time from a given instruction queue is controlled by a stop flag in a sequence of instructions in that queue.

52. The method of claim 48, comprising launching and executing multiple instructions from one or more threads simultaneously.

53. A method of embedded processing, comprising the steps of
A. executing one or more processes or threads (which one or more processes or threads are collectively referred to as "threads") on each of a plurality of processing units such that plural threads are executing on one or more processing units,
B. delivering events to respective threads with which those events are associated without execution of instructions by said processing units, wherein a said event is any of (i) a hardware interrupt generated other than by the processing unit that is executing the thread to which that hardware interrupt is delivered, (ii) a software interrupt generated other than by the thread to which that software interrupt is delivered.

54. The method of claim 53, comprising the step of processing the event to which the thread is delivered without execution of instructions outside that thread.

55. The method of claim 53, wherein each thread is any of constrained or not constrained to execute on a same processing unit during a life of that thread.

56. The method of claim 53, wherein at least one of the processing units is a virtual processing unit.

57. A method of embedded processing, comprising the steps of
A. executing a plurality of virtual processing units on a plurality of embedded processors,
B. executing one or more processes or threads (which one or more processes or threads are collectively referred to as "threads") on each of a plurality of virtual processing units such that one or more embedded processors has plural threads executing thereon, and
C. delivering events to respective threads with which those events are associated without execution of instructions by said virtual processing units, wherein a said event is any of (i) a hardware interrupt generated other than by the processing unit that is executing the thread to which that hardware interrupt is delivered, (ii) a software interrupt generated other than by the thread to which that software interrupt is delivered.

58. The method of claim 57, wherein processing the event by the thread to which the event is delivered without execution of instructions outside that thread.

59. The method of claim 58, wherein each thread is any of constrained or not constrained to execute on a same virtual processing unit and/or a same embedded processor during a life of that thread.

60. An embedded processor, comprising
A. a plurality of processing units, each of which execute one or more processes or threads (which one or more processes or threads are collectively referred to as "threads") and one or more of which execute a plurality of threads, B. an event delivery mechanism that delivers events to respective threads with which those events are associated, wherein a said event is any of (i) loading of cache memory following a cache miss by the thread to which that event is delivered, (ii) filling of a memory location by a thread, other than the thread to which that notification is delivered, in response to a memory instruction issued by the thread to which that notification is delivered, and wherein the event delivery mechanism:
  i. is in communication coupling with the plurality of processing units, and
  ii. delivers each such event to the respective thread without execution of instructions by said processing units.

61. A method of embedded processing, comprising the steps of
  A. executing one or more processes or threads (which one or more processes or threads are collectively referred to as "threads") on each of a plurality of processing units such that plural threads are executing on one or more processing units,
  B. delivering events to respective threads with which those events are associated without execution of instructions by said processing units, wherein a said event is any of (i) loading of cache memory following a cache miss by the thread to which that event is delivered, (ii) filling of a memory location by a thread, other than the thread to which that notification is delivered, in response to a memory instruction issued by the thread to which that notification is delivered.

* * * * *